US008648986B2

(12) United States Patent
Shibazaki

(10) Patent No.: US 8,648,986 B2
(45) Date of Patent: Feb. 11, 2014

(54) SYMMETRIC DIFFUSION FILM AND FLAT PANEL DISPLAY APPLIED WITH THE SAME

(75) Inventor: Minoru Shibazaki, Hyogo (JP)

(73) Assignee: Chimei Innolux Corporation, Chu-Nan (TW)

( * ) Notice: Subject to any disclaimer, the term of this patent is extended or adjusted under 35 U.S.C. 154(b) by 67 days.

(21) Appl. No.: 13/301,697

(22) Filed: Nov. 21, 2011

(65) Prior Publication Data

US 2013/0128198 A1    May 23, 2013

(51) Int. Cl.
*G02F 1/1335*    (2006.01)

(52) U.S. Cl.
USPC .......................................................... 349/112

(58) Field of Classification Search
USPC .......................................................... 349/112
See application file for complete search history.

(56) References Cited

U.S. PATENT DOCUMENTS

| | | | | |
|---|---|---|---|---|
| 6,480,249 | B2* | 11/2002 | Iwata et al. | 349/112 |
| 2005/0195345 | A1* | 9/2005 | Chiang et al. | 349/114 |
| 2008/0123031 | A1* | 5/2008 | Homma et al. | 349/112 |
| 2009/0002597 | A1* | 1/2009 | Watanabe | 349/62 |

* cited by examiner

*Primary Examiner* — Wen-Ying P Chen
(74) *Attorney, Agent, or Firm* — Liu & Liu

(57) ABSTRACT

A symmetric diffusion film (SDF) and a flat panel display applied with the same are provided. The SDF comprises at least two different materials of a first material having a first refractive index mixed with a second material having a second refractive index, and the first refractive index is different from the second refractive index. The flat panel display comprises a symmetric diffusion film (SDF) disposed at one side of the upper polarizer, and the upper polarizer adapting no compensation film.

18 Claims, 27 Drawing Sheets

SYMMETRIC DIFFUSION FILM AND FLAT PANEL DISPLAY APPLIED WITH THE SAME

BACKGROUND

1. Technical Field

The disclosed embodiments relate in general to a symmetric diffusion film and flat panel display applied with the same, and more particularly to a wide viewing angle flat panel display applied with the symmetric diffusion film.

2. Description of the Related Art

A liquid crystal display (LCD) is a flat panel display, electronic visual display, video display that uses the light modulating properties of liquid crystals (LCs). LCDs have displaced cathode ray tube (CRT) displays in most applications since they are more compact, lightweight, portable, less expensive, more reliable, and easier on the eyes. Today, LCDs are most commonly used displays and are available in a wide range of shapes, sizes, levels of quality and models, and are used in a wide range of applications, including computer monitors, television, instrument panels, aircraft cockpit displays, signage, etc.

Currently, there are several known modes of LCD in the market, such as fringe field switching (FFS) mode, vertical alignment (VA) mode, twisted nematic (TN) mode and optically compensated bend (OCB) mode. FFS mode of LCD is known for wide viewing angle, high cost, low yield, and low transmittance. Conventional VA mode of LCD requires expensive optimal compensator, which increases the cost. Also, the viewing angle performance of VA mode LCD is not quite good, and the VA mode LCD displays white wash-out image viewed at some angles. TN mode of LCD has simple structure but bad viewing angle performance. OCB mode of LCD has very fast response time; however, optimal compensator is required and the production cost is high. No matter what kind of LCD mode is adopted, the consumers always pursuit the ideal image with great quality displayed on the low-cost LCD, such as wide viewing angle, small gray scale inversion, small color change and small hue shift of the image displayed thereon.

SUMMARY

The disclosure is directed to a symmetric diffusion film and a wide viewing angle flat panel display applied with the same. The flat panel display structure of the embodiment utilizes a symmetric diffusion film (SDF) and the polarizer without viewing angle compensation film. The display of the embodiment has a simple structural construction and can be manufactured with low cost of fabrication. Also, the quality of the images presented on the flat panel display provided according to the embodiment has been greatly improved.

According to one embodiment, a symmetric diffusion film (SDF) applicable to a flat panel display is provided, comprising at least two different materials of a first material having a first refractive index mixed with a second material having a second refractive index, and the first refractive index being different from the second refractive index.

According to another embodiment, a flat panel display having a panel configured to display an image and an upper polarizer attached on the panel is provided. The improvement of the flat panel display comprises a symmetric diffusion film (SDF) disposed at one side of the upper polarizer, and the upper polarizer adapting no compensation film. The SDF comprises at least two different materials including a first material having a first refractive index mixed with a second material having a second refractive index, and the first refractive index is different from the second refractive index.

According to another embodiment, a flat panel display is provided, comprising a liquid crystal (LC) panel including a LC layer, an upper polarizer disposed on the LC panel and adapting no compensation film, and a symmetric diffusion film (SDF) as described above disposed at one side of the upper polarizer, wherein a collimated light passes the LC panel. In one embodiment, a half-width at half-maximum (HWHM) of the collimated light scattered by the SDF is in a range of 5 degree to 20 degree.

Figure 1A:
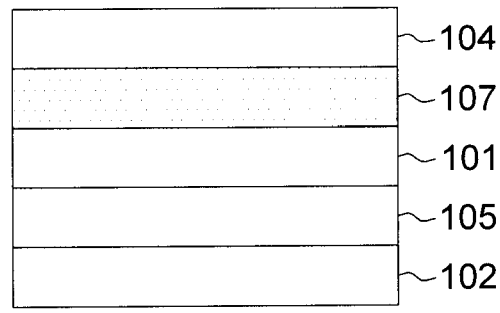
FIG. 1A and FIG. 1B simply illustrates two transmissive types of LCD according to the first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The embodiments of the present disclosure provide a symmetric diffusion film and a wide viewing angle flat panel display applied with the same. The flat panel display structure of the embodiment (such as liquid crystal display, LCD) utilizes a symmetric diffusion film (SDF), and the polarizer without viewing angle compensation film can be adopted in the display structure. Elimination of high cost compensation film decreases the manufacture cost of the flat panel display. The flat panel display of the embodiment has a simple structural construction and can be manufactured with low cost of fabrication. Therefore, the flat panel display of the embodiment is suitable for mass productions. Also, flat panel display of the embodiment solves the color-changing problems (such as white wash-out or yellowish images) occurring at the deep viewing angle which the traditional displays have. Thus, the quality of the images presented on the flat panel display provided according to the embodiment has been greatly improved. The flat panel displays of the embodiments possess the advantages of wide viewing angle, no gray scale inversion, small color change and small hue shift of the image displayed thereon.

The flat panel display structure of the embodiment can be widely used in a variety of applications, such as transmissive, reflective, and transflective types of LCD. It is also applicable for different modes of LCD, such as fringe field switching (FFS) mode, vertical alignment (VA) mode, twisted nematic (TN) mode and optically compensated bend (OCB) mode.

LCD embodiments are provided to demonstrate, but not intended to limit, the display structures of the present disclosure. The modifications and variations can be made without departing from the spirit of the disclosure to meet the requirements of the practical applications.

First Embodiment

Transmissive Type of LCD

Figure 1B:
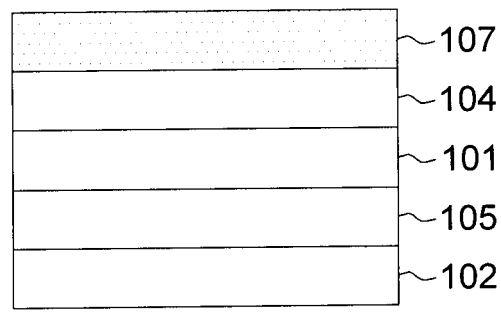

FIG. 1A and FIG. 1B simply illustrates two transmissive types of LCD according to the first embodiment of the present disclosure.

A transmissive type of LCD 10 or 10' comprises a liquid crystal (LC) panel (containing a LC layer) 101, a backlight system 102 disposed under the LC panel 101 for providing a collimated light towards the LC panel 101, an upper polarizer 104, a lower polarizer 105, and a symmetric diffusion film (SDF) 107 disposed at one side of the upper polarizer 104. The LC panel 101 is disposed between the lower polarizer 105 and the upper polarizer 104. The upper polarizer 104 and the lower polarizer 105 are crossed relative to one another to provide a cross-polarization effect. The structural difference between LCD 10 and LCD 10' is the position of the SDF 107. In FIG. 1A, the SDF 107 is disposed at the rear surface of the upper polarizer 104, and sandwiched between the upper polarizer 104 and the LC panel 101. In FIG. 1B, the SDF 107 is disposed at the top (i.e. front surface) of the upper polarizer 104. According to the first embodiment, no compensation film such as wide-view films is required for the upper polarizer 104 and the lower polarizer 105.

Figure 2A:
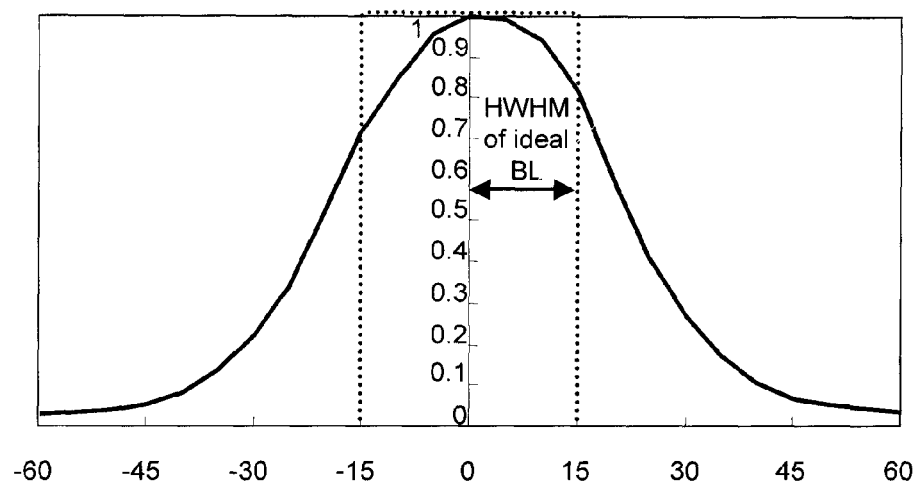
FIG. 2A shows the contrast ratios (CR) of an ideal backlight system.
Figure 2B:
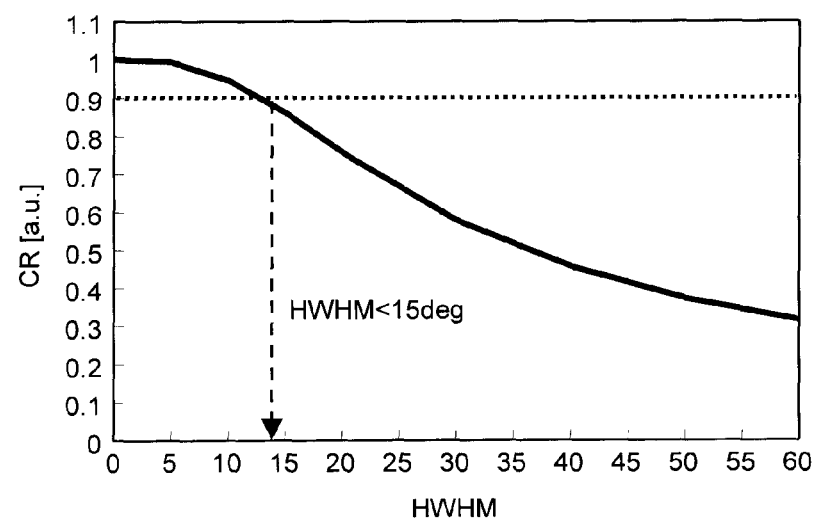
FIG. 2B shows the contrast ratios (CR) as a function of the HWHM.

According to the first embodiment, the backlight system 102 disposed under the LC panel 101 provides a collimated light towards the LC panel 101, and a half-width at half-maximum (HWHM) of the collimated light is in a range of 5 degree to 15 degree, approximately. FIG. 2A shows the contrast ratios (CR) of an ideal backlight system. FIG. 2B shows the contrast ratios (CR) as a function of the HWHM. When the HWHM of backlight is in a range of 5 degree to 15 degree, the contrast ratio is approximately in a range of 1 to 0.1, as shown in FIG. 2B. Contrast ratio (CR) is the ratio of luminance between the brightest "white" and the darkest "black" that can be produced on a display. CR is another major determinant of perceived picture quality. A picture has high CR can be judged as sharper and more crisp than a picture with lower CR.

Figure 3A:
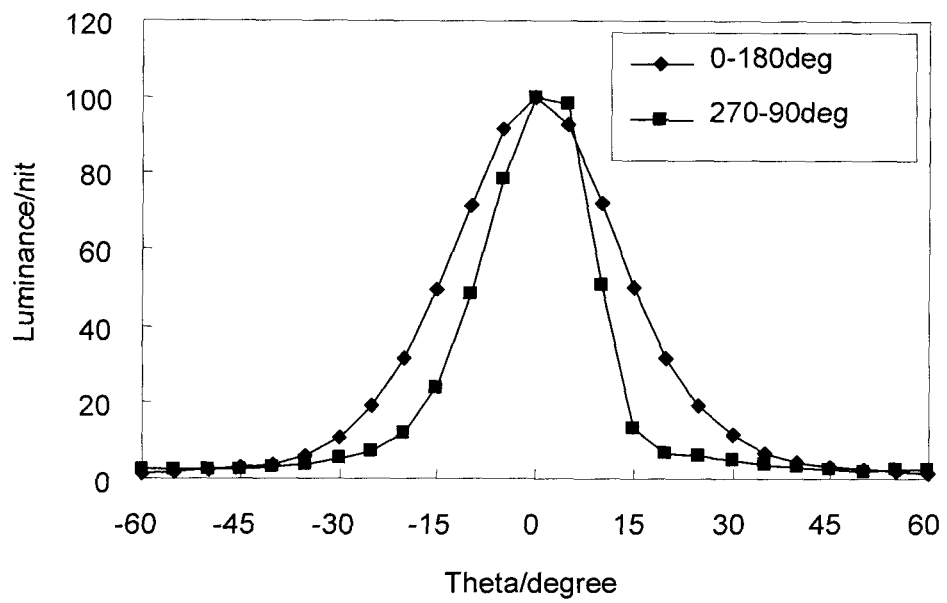
FIG. 3A shows the angle-dependent luminance distribution in the horizontal (H) and vertical (V) directions of the backlight system 1.
Figure 3B:
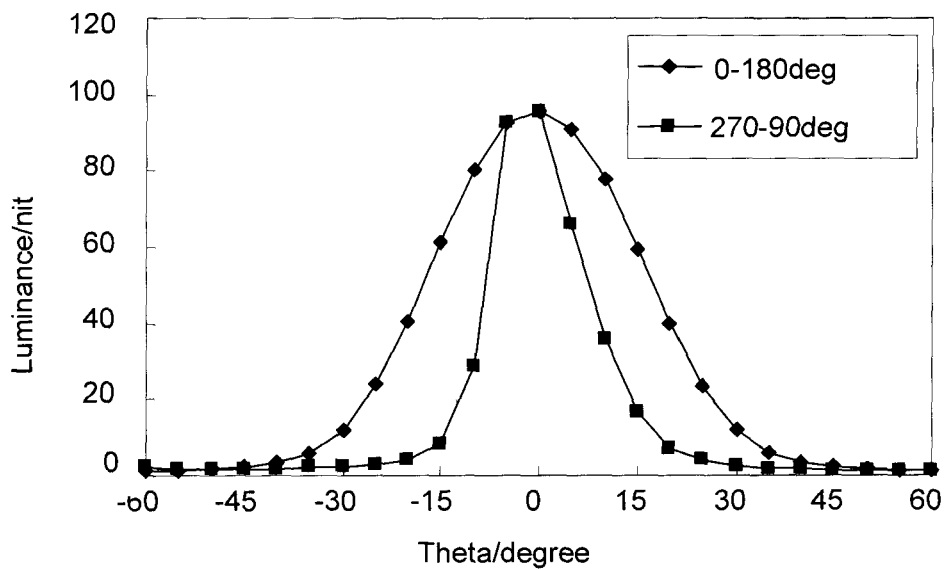
FIG. 3B shows the angle-dependent luminance distribution in the horizontal (H) and vertical (V) directions of the backlight system 2.

Also, two collimated backlight systems are examined to see the backlight performance. FIG. 3A shows the angle-dependent luminance distribution in the horizontal (H) and vertical (V) directions of the backlight system 1. FIG. 3B shows the angle-dependent luminance distribution in the horizontal (H) and vertical (V) directions of the backlight system 2. As shown in FIG. 3B, the HWHM in the horizontal (H) and vertical (V) directions are about 18 degree and 8 degree, respectively. As shown in FIG. 3A, the HWHM in the horizontal (H) and vertical (V) directions are respectively about 15 degree and 10 degree.

Figure 4A:
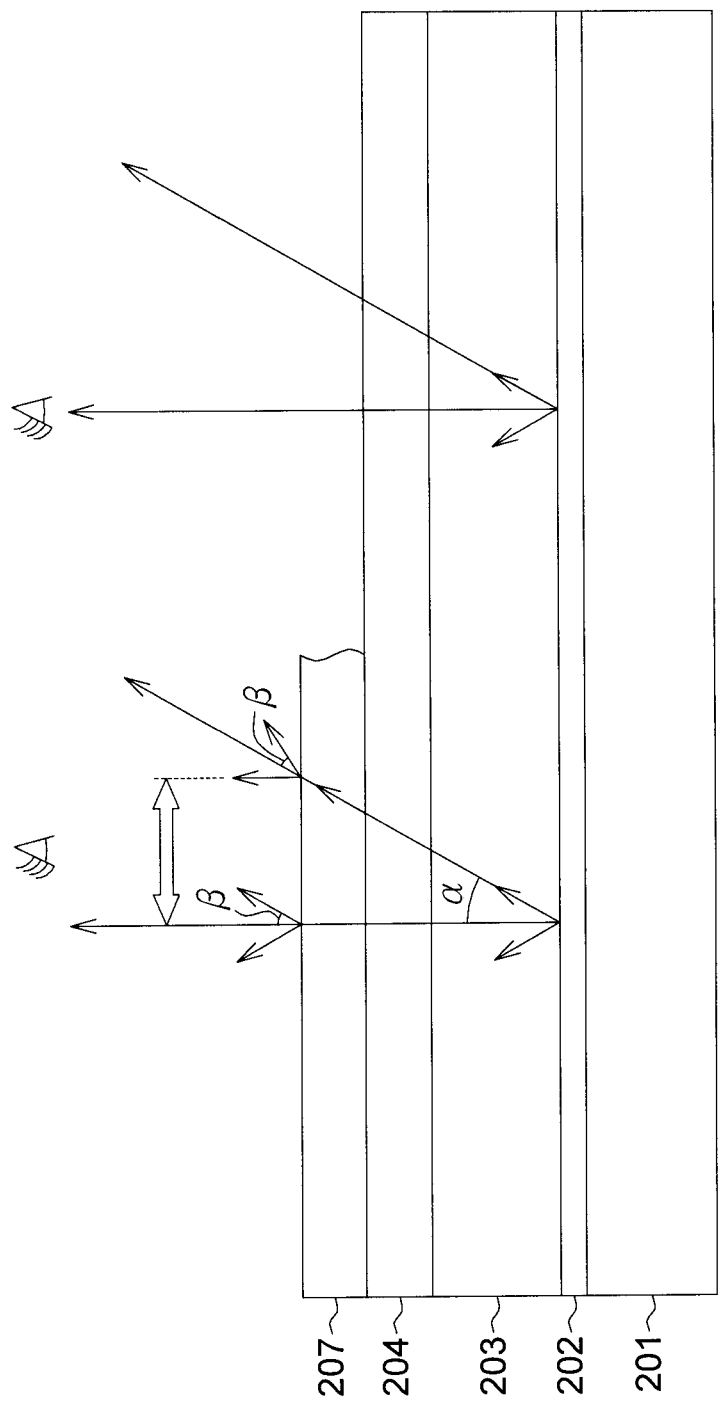
FIG. 4A simply illustrates the image blur conditions of LCD structure with diffuser and without diffuser.
Figure 4B:
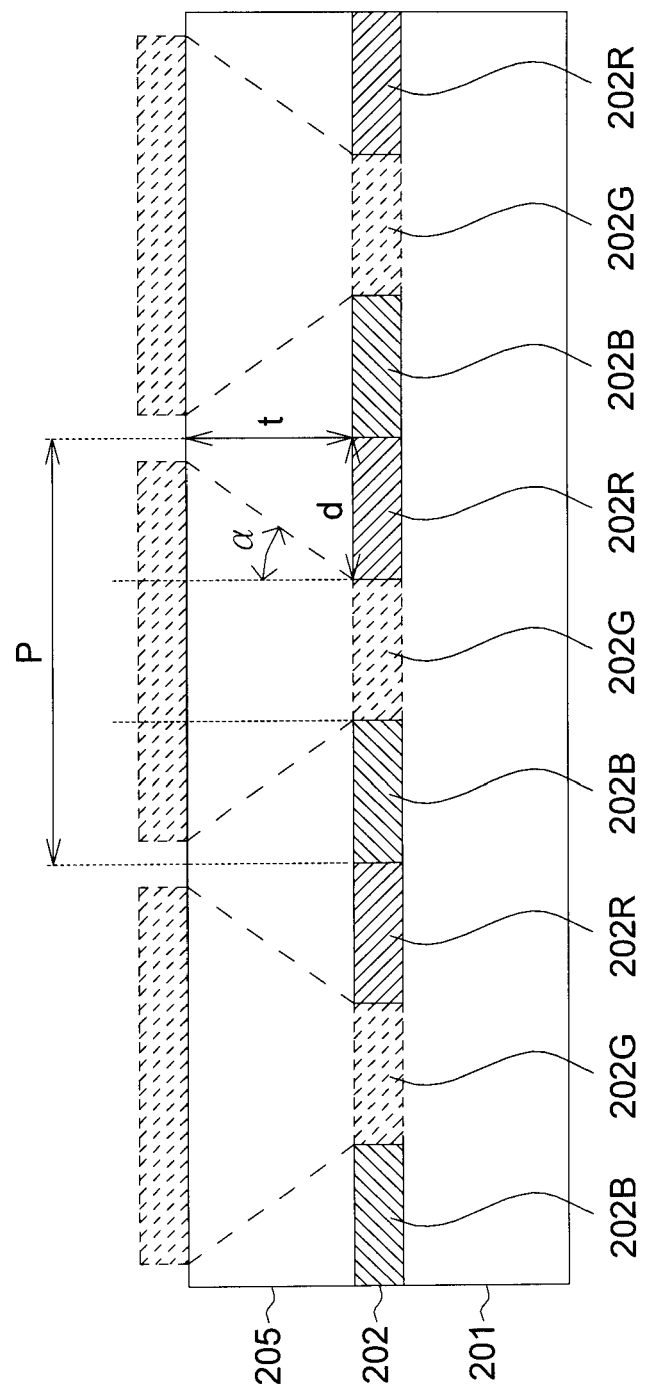
FIG. 4B simply illustrates the image blur consideration of the LCD structure.

To improve image blur, distance between the LC layer and the diffuser should be short or light from the backlight system should have small scattering angle. For example, thinner glass, thinner polarizer or appropriate diffuser position could be adopted for reducing the distance between the LC layer and the diffuser. Also, a collimated light is used in the embodiments of the present disclosure. FIG. 4A simply illustrates the image blur conditions of LCD structure with diffuser and without diffuser. According to the embodiment (i.e. left-hand side of FIG. 4), the SDF 207 is disposed at the upper polarizer 204, and the collimated light (with a spread angle α) from the backlight system passes the lower glass substrate 201, the LC layer 202, the upper glass substrate 203, the upper polarizer 204 and scattered by the SDF 207 with an angle β. Angle β is also varied with the thickness of the SDF 207. FIG. 4B simply illustrates the image blur consideration of the LCD structure, wherein the glass and film layer 205 represents an upper glass substrate and a diffuser. Each pixel P contains three colored sub-pixels, including blue sub-pixel 202B, green sub-pixel 202G and red sub-pixel 202R. To recognized mono-color line, the equation as below should be satisfied:

$$\alpha \le \tan^{-1}\left(\frac{d}{t}\right)$$

wherein d is ⅓ of pixel size, t is a thickness of the glass and film layer 205, α is the spread angle of the backlight (HWHM) which is corresponding to the thickness t of the glass and film layer 205.

In the embodiment, the SDF (symmetric diffusion film) disposed at one side of the upper polarizer, and a half-width at half-maximum (HWHM) of the light scattered by the SDF 207 is in a range of 5 degree to 20 degree. In one embodiment, when the HWHM of the SDF 207 is about 20 degree, 200 μm of the glass thickness is applicable but not limited.

According to the embodiment, the SDF comprises at least two different materials, including a first material having a first refractive index mixed (or blended) with a second material having a second refractive index, and the first refractive index n1 is different from the second refractive index n2. In one embodiment, the difference in the first refractive index n1 and the second refractive index n2 is larger than 0 and no more than 0.1. The second material could be configured as particles and distributed in the first material. Particle size of the second material could be in a range of 0.1 μm to 10 μm.

Figure 5:
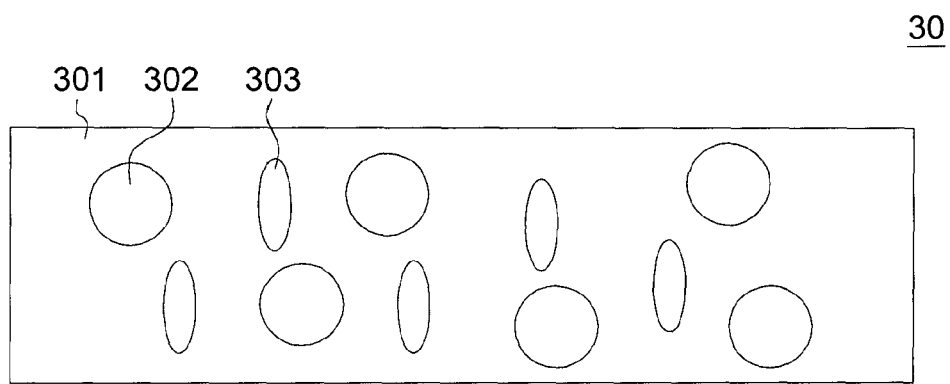
FIG. 5 schematically illustrates a SDF according to the embodiment of the present disclosure.

FIG. 5 schematically illustrates a SDF according to the embodiment of the present disclosure. The SDF 30 of FIG. 5 comprises three different materials, including the first material 301 having a first refractive index n1, a second material 302 having a second refractive index n2, and a third material 303 having a third refractive index n3. The third refractive index n3 is different from the first index n1 and the second index n2. The second material 302 and the third material 303 are configured as the particles distributed in the first material 301. The difference in the third refractive index n3 and the second refractive index n2 or the difference in the third refractive index n3 and the first refractive index n1 is within 0.1. Examples of particle size of the third material are in a range of 0.1 μm to 10 μm. Examples of refractive indexes of the SDF materials include n1=1.6 and n2=1.5, n1=1.5 and n2=1.6, n1=1.6, n2=1.5 and n3=1.4.

In one embodiment, the first material 301 could be organic materials, such as glue, adhesive or resin (ex. polyethylene terephthalate, PET). The second material 302 and the third material 303 could be independently selected from the non-organic materials (such as glass (SiOx), SiNx), and transparent conductive materials (such as Indium-Tin Oxide (ITO), In—Al—Zn—O (IAZO), In—Ga—Zn—O (GZO)). Also, a thickness of the SDF of the embodiment is, but not limited to, between 20 μm and 200 μm.

Many different methods can be applied for manufacturing SDF, and the disclosure is not limited to a particular one. In one embodiment, the SDF 30 could be formed by distributing the particles of the second material and/or the third material into the first material, and then the first material is cured to be mixed with the particles of the second material and/or the third material. For example, an organic material (such as glue, adhesive, PET . . . ) is liquefied at a sufficiently high temperature, and the particles of the second material and/or the third material are added into the melted organic material, and then stirred to combine evenly. The mixture is then cured for solidification.

Related Experiments and Results

Three different LCD structures with M-VA mode have been provided to investigate the performances, such as gamma curves, gray scale inversion (GSI) and color shift conditions. In the experiments, an M-VA mode LCD without compensation film (as shown in FIG. 1A) and the SDF with a HWHM of 18 degree is provided as the LCD structures of the embodiment. Also, collimated backlight system 2 is adopted in the experiments. Besides the LCD structures of the embodiment, an M-VA mode LCD with compensation film (i.e. the current VA display, no SDF) and an M-VA mode LCD without compensation film (no SDF) are also provided as the reference panels for comparison.

The measurement results of the M-VA mode LCD with compensation film (i.e. the current VA display, no SDF) for comparison are presented in FIG. 6A~FIG. 6G.

Figure 6A:
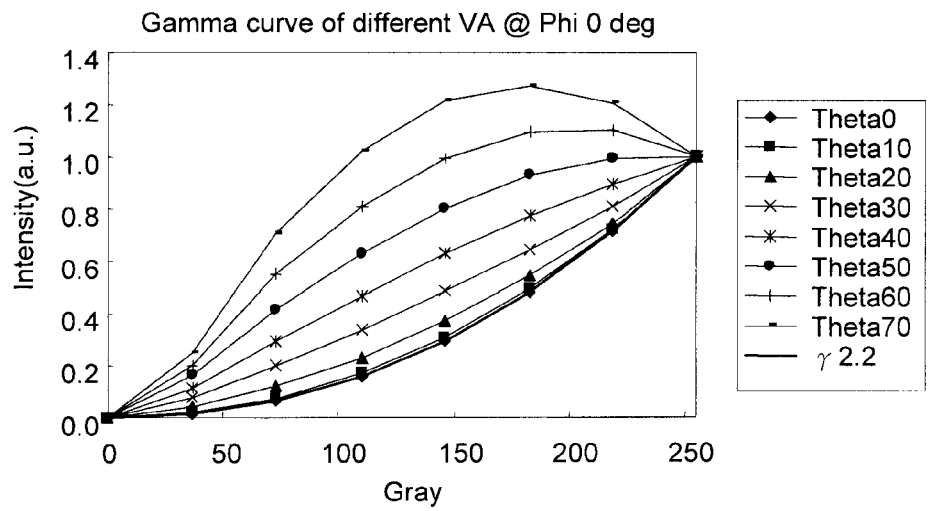
FIG. 6A shows the gamma curves that relate the brightness intensity to the gray scale at eight different viewing angles (theta 0~70) at 0 degree of polar angle Phi of the M-VA mode LCD with compensation film (i.e. the current VA display, no SDF).
Figure 6B:
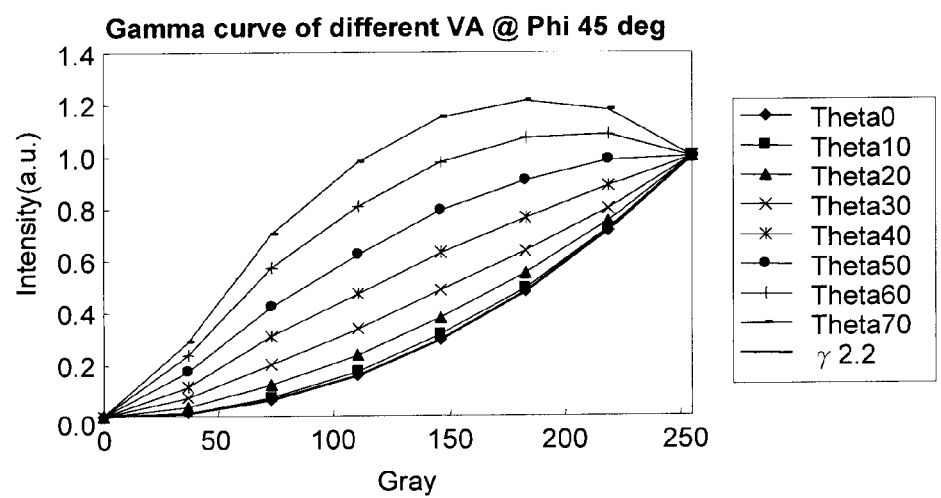
FIG. 6B shows the gamma curves that relate the brightness intensity to the gray scale at eight different viewing angles (theta 0~70) at 45 degree of polar angle Phi of the M-VA mode LCD with compensation film (i.e. the current VA display, no SDF).
Figure 6C:
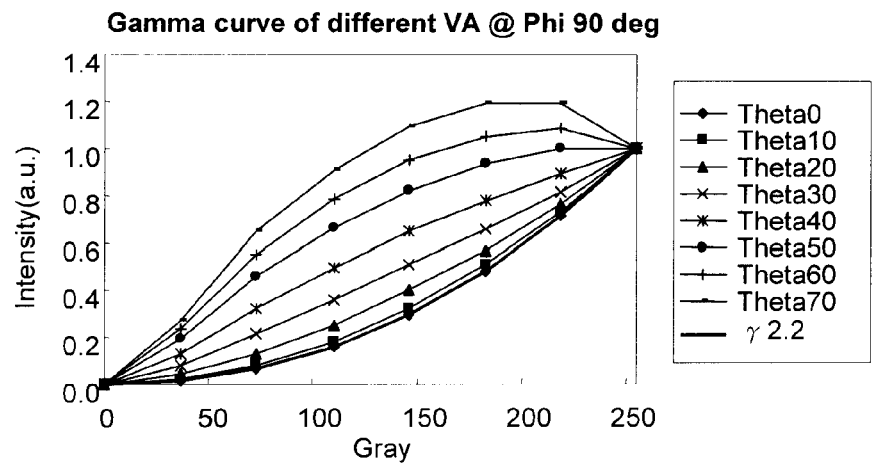
FIG. 6C shows the gamma curves that relate the brightness intensity to the gray scale at eight different viewing angles (theta 0~70) at 90 degree of polar angle Phi of the M-VA mode LCD with compensation film (i.e. the current VA display, no SDF).
Figure 6D:
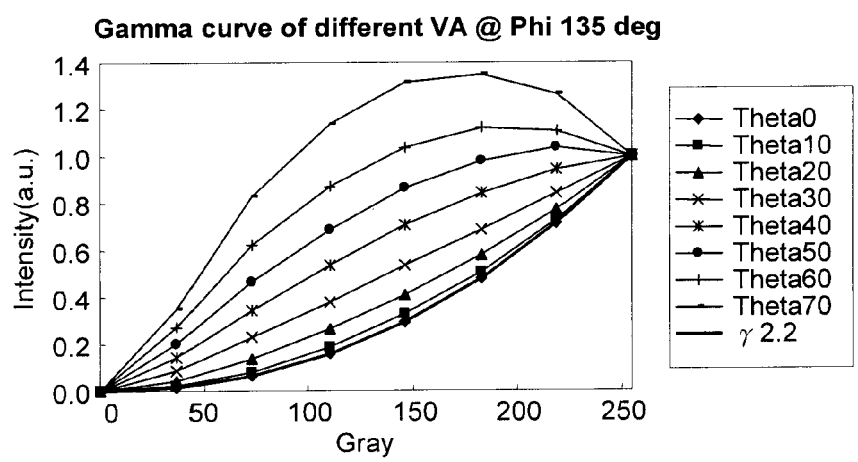
FIG. 6D shows the gamma curves that relate the brightness intensity to the gray scale at eight different viewing angles (theta 0~70) at 135 degree of polar angle Phi of the M-VA mode LCD with compensation film (i.e. the current VA display, no SDF).
Figure 6E:
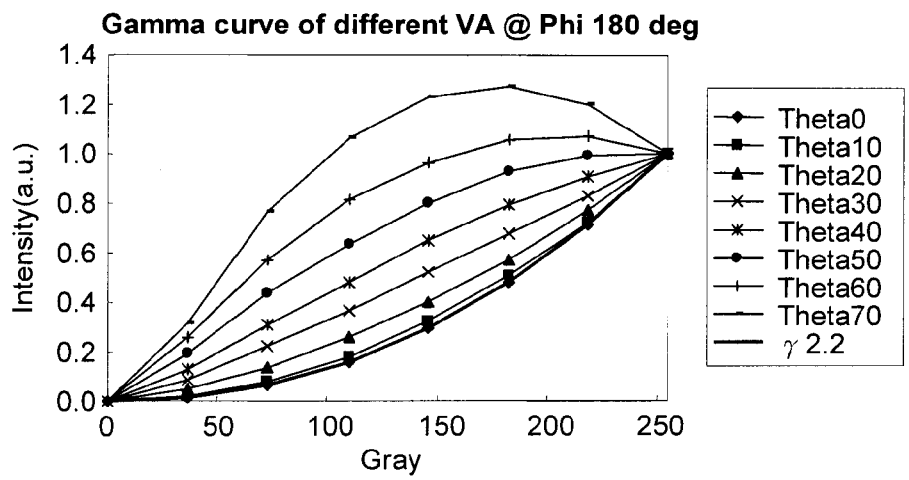
FIG. 6E shows the gamma curves that relate the brightness intensity to the gray scale at eight different viewing angles (theta 0~70) at 180 degree of polar angle Phi of the M-VA mode LCD with compensation film (i.e. the current VA display, no SDF).

FIG. 6A shows the gamma curves that relate the brightness intensity to the gray scale at eight different viewing angles (i.e. Theta 0, Theta 10, Theta 20, Theta 30, Theta 40, Theta 50, Theta 60 and Theta 70) at 0 degree of polar angle Phi ($\phi$), wherein a standard $\gamma=2.2$ power-law curve is also presented for comparison. Similarly, FIG. 6B shows the gamma curves that relate the brightness intensity to the gray scale at eight different viewing angles at 45 degree of Phi ($\phi$), FIG. 6C shows the gamma curves that relate the brightness intensity to the gray scale at eight different viewing angles at 90 degree of Phi ($\phi$), FIG. 6D shows the gamma curves that relate the brightness intensity to the gray scale at eight different viewing angles at 135 degree of Phi ($\phi$), and FIG. 6E shows the gamma curves that relate the brightness intensity to the gray scale at eight different viewing angles at 180 degree of Phi ($\phi$). The gamma curves in each of FIG. 6A~FIG. 6E, which represents the performance of the M-VA mode LCD with compensation film (i.e. the current VA display, no SDF), have shown considerable differences from the standard $\gamma=2.2$ power-law curve.

Figure 6F:
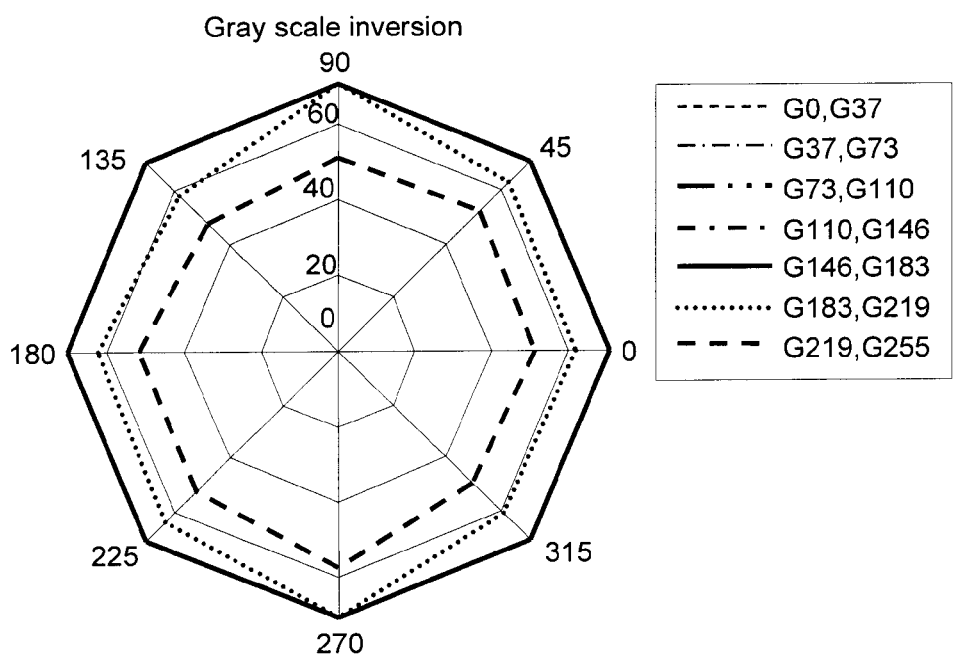
FIG. 6F shows the iso-contrast curves at different gray scale levels from gray 0 (black) to gray 255 (white) of the M-VA mode LCD with compensation film (i.e. the current VA display, no SDF).

FIG. 6F shows the iso-contrast curves at different gray scale levels from gray 0 (black) to gray 255 (white). The gray scale inversion (GSI) of the M-VA mode LCD with compensation film (i.e. the current VA display, no SDF) occurs at 50 degree, approximately.

Figure 6G:
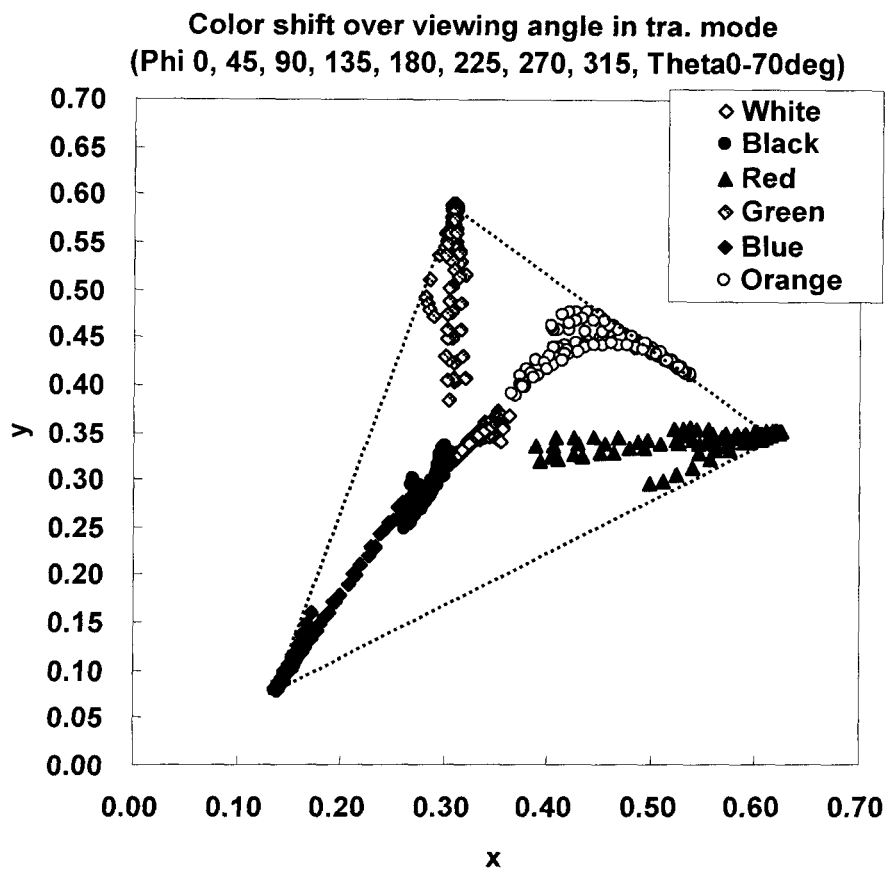
FIG. 6G shows a CIE xy chromaticity diagram plotted by colors obtained at different viewing angle theta 0~70 degree and at 0, 45, 90, 135, 180, 225, 270 and 315 degree of Phi of the M-VA mode LCD with compensation film (i.e. the current VA display, no SDF).

Furthermore, FIG. 6G shows a CIE xy chromaticity diagram plotted by colors obtained at different viewing angle Theta 0~70 degree and at 0, 45, 90, 135, 180, 225, 270 and 315 degree of Phi. In the CIE xy chromaticity diagram, each point represents a pure hue of a single wavelength. Since the human eye has three types of color sensors that respond to different ranges of wavelengths, a full plot of all visible colors is a three-dimensional figure. However, the concept of color can be divided into two parts: brightness and chromaticity. For example, the color white is a bright color, while the color grey is considered to be a less bright version of that same white. In other words, the chromaticity of white and grey are the same while their brightness differs. FIG. 6G clearly shows that large hue shift over viewing angle occurs, and the white and orange colors of the image displayed by the M-VA mode LCD with compensation film (i.e. the current VA display, no SDF) would be yellowish.

The measurement results of the M-VA mode LCD without compensation film (no SDF) for comparison are presented in FIG. 7A~FIG. 7G.

Figure 7A:
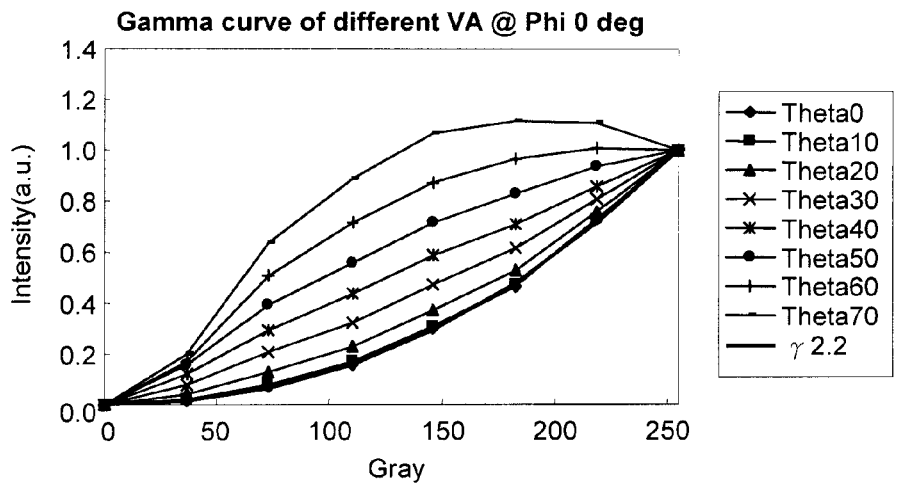
FIG. 7A shows the gamma curves that relate the brightness intensity to the gray scale at eight different viewing angles (theta 0~70) at 0 degree of polar angle Phi of the M-VA mode LCD without compensation film (no SDF).
Figure 7B:
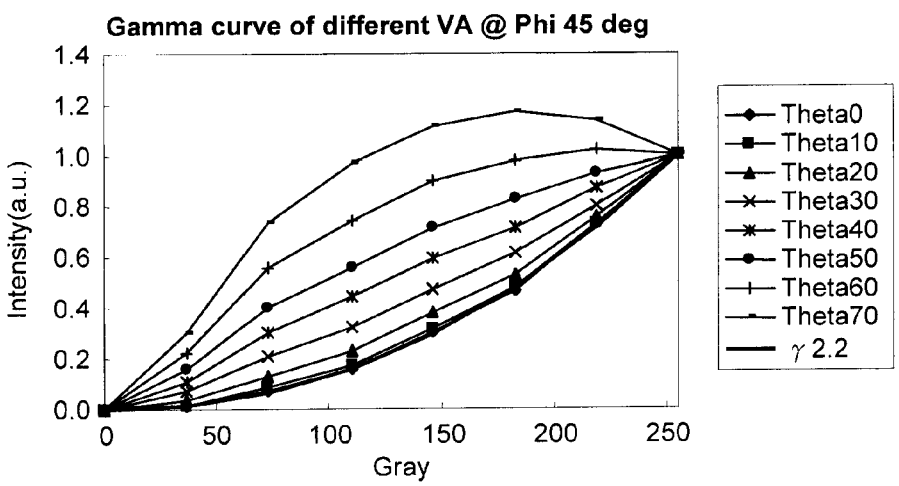
FIG. 7B shows the gamma curves that relate the brightness intensity to the gray scale at eight different viewing angles (theta 0~70) at 45 degree of polar angle Phi of the M-VA mode LCD without compensation film (no SDF).
Figure 7C:
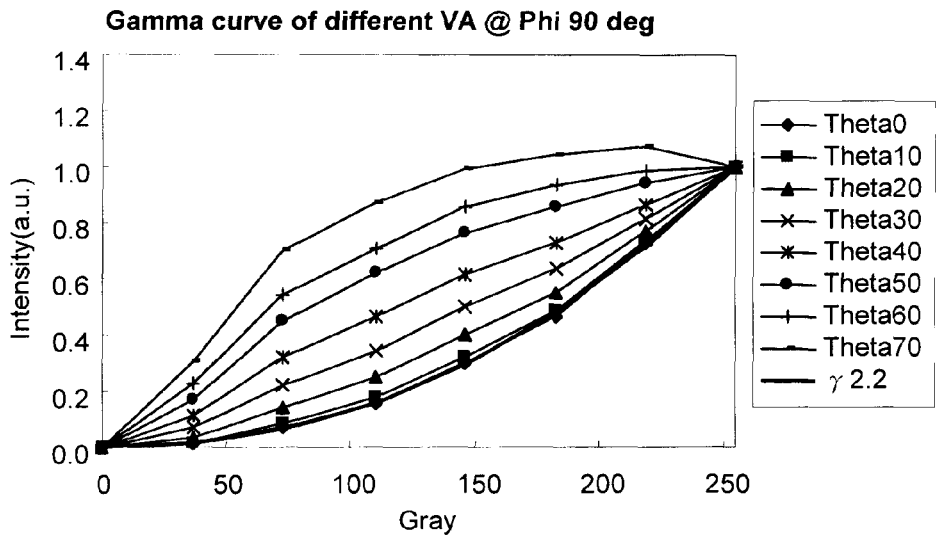
FIG. 7C shows the gamma curves that relate the brightness intensity to the gray scale at eight different viewing angles (theta 0~70) at 90 degree of polar angle Phi of the M-VA mode LCD without compensation film (no SDF).
Figure 7D:
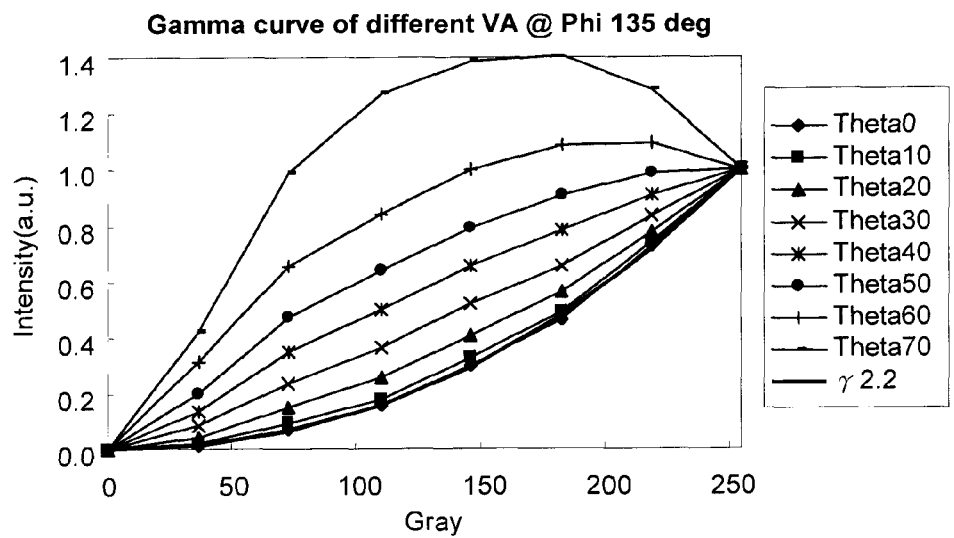
FIG. 7D shows the gamma curves that relate the brightness intensity to the gray scale at eight different viewing angles (theta 0~70) at 135 degree of polar angle Phi of the M-VA mode LCD without compensation film (no SDF).
Figure 7E:
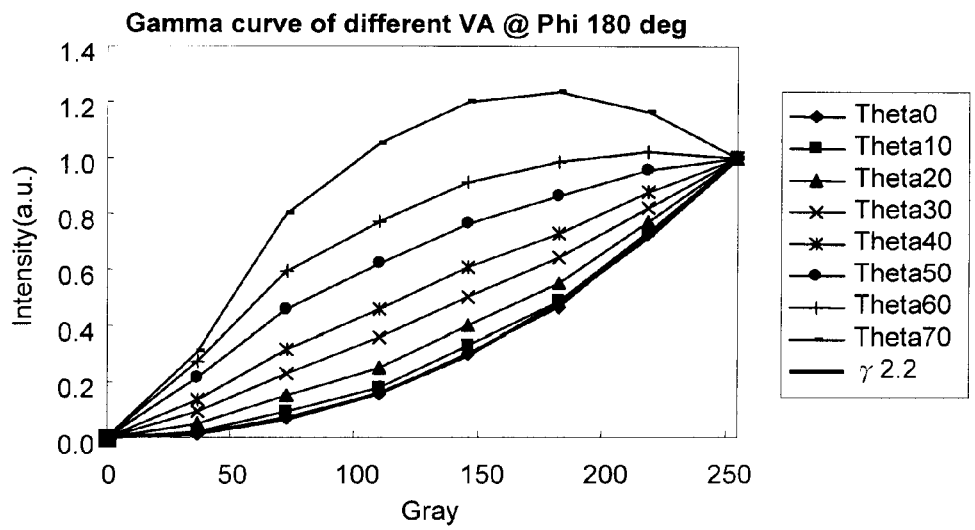
FIG. 7E shows the gamma curves that relate the brightness intensity to the gray scale at eight different viewing angles (theta 0~70) at 180 degree of polar angle Phi of the M-VA mode LCD without compensation film (no SDF).

FIG. 7A shows the gamma curves that relate the brightness intensity to the gray scale at eight different viewing angles (i.e. Theta 0, Theta 10, Theta 20, Theta 30, Theta 40, Theta 50, Theta 60 and Theta 70) at 0 degree of Phi ($\phi$), wherein a standard $\gamma=2.2$ power-law curve is also presented for comparison. FIG. 7B shows the gamma curves that relate the brightness intensity to the gray scale at eight different viewing angles at 45 degree of Phi ($\phi$), FIG. 7C shows the gamma curves that relate the brightness intensity to the gray scale at eight different viewing angles at 90 degree of Phi ($\phi$), FIG. 7D shows the gamma curves that relate the brightness intensity to the gray scale at eight different viewing angles at 135 degree of Phi ($\phi$), and FIG. 7E shows the gamma curves that relate the brightness intensity to the gray scale at eight different viewing angles at 180 degree of Phi ($\phi$). Similar to FIG. 6A~FIG. 6E, the gamma curves in each of FIG. 7A~FIG. 7E, which represents the performance of the M-VA mode LCD without compensation film and no SDF, have shown considerable differences from the standard $\gamma=2.2$ power-law curve.

Figure 7F:
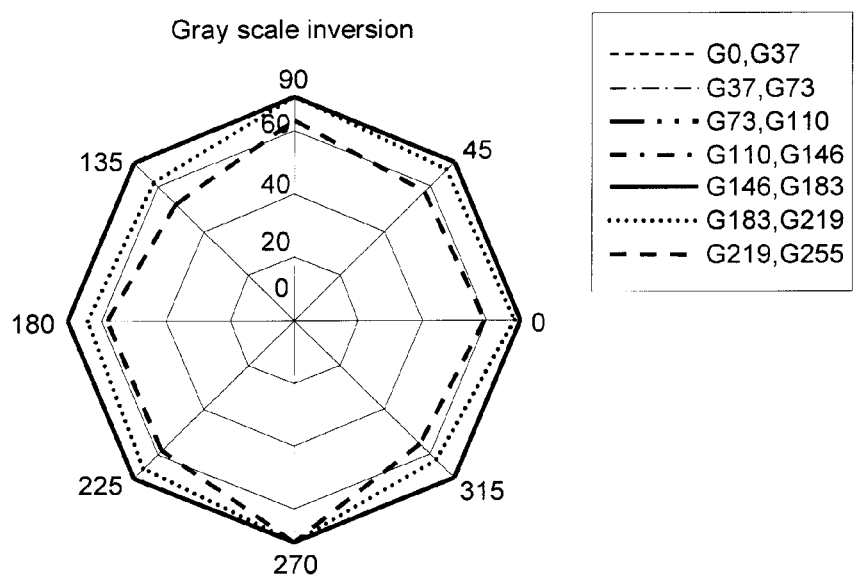
FIG. 7F shows the iso-contrast curves at different gray scale levels from gray 0 (black) to gray 255 (white) of the M-VA mode LCD without compensation film (no SDF).

FIG. 7F shows the iso-contrast curves at different gray scale levels from gray 0 (black) to gray 255 (white). The gray scale inversion (GSI) of the M-VA mode LCD without compensation film (and no SDF) occurs at 60 degree, approximately.

Figure 7G:
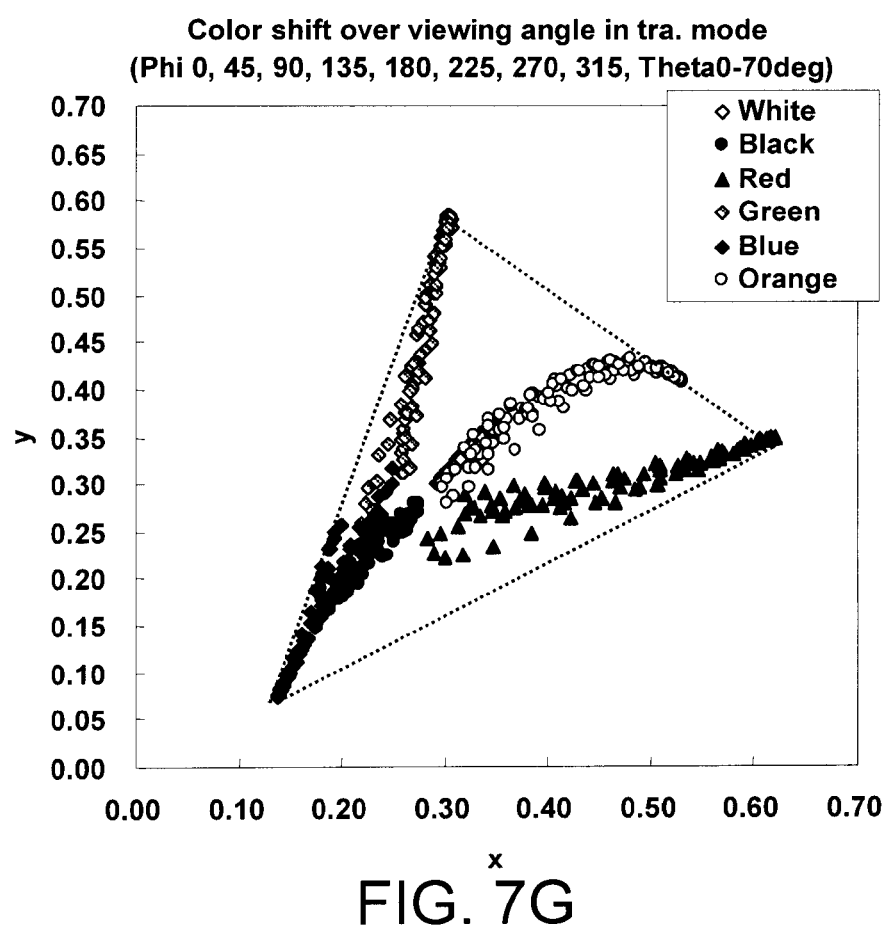
FIG. 7G shows a CIE xy chromaticity diagram plotted by colors obtained at different viewing angle theta 0~70 degree and at 0, 45, 90, 135, 180, 225, 270 and 315 degree of Phi of the M-VA mode LCD without compensation film (no SDF).

Furthermore, FIG. 7G shows a CIE xy chromaticity diagram plotted by colors obtained at different viewing angle Theta 0~70 degree and at 0, 45, 90, 135, 180, 225, 270 and 315 degree of Phi. In the CIE xy chromaticity diagram, each point represents a pure hue of a single wavelength. Similar to FIG. 6G, FIG. 7G clearly shows that large hue shift over viewing angle occurs, and the colors of the image displayed by the M-VA mode LCD without compensation film and SDF would be undesirably changed.

The measurement results of the M-VA mode LCD of the embodiment, without compensation film and with SDF (HWHM of 18 degree) and collimated backlight, are presented in FIG. 8A~FIG. 8G.

Figure 8A:
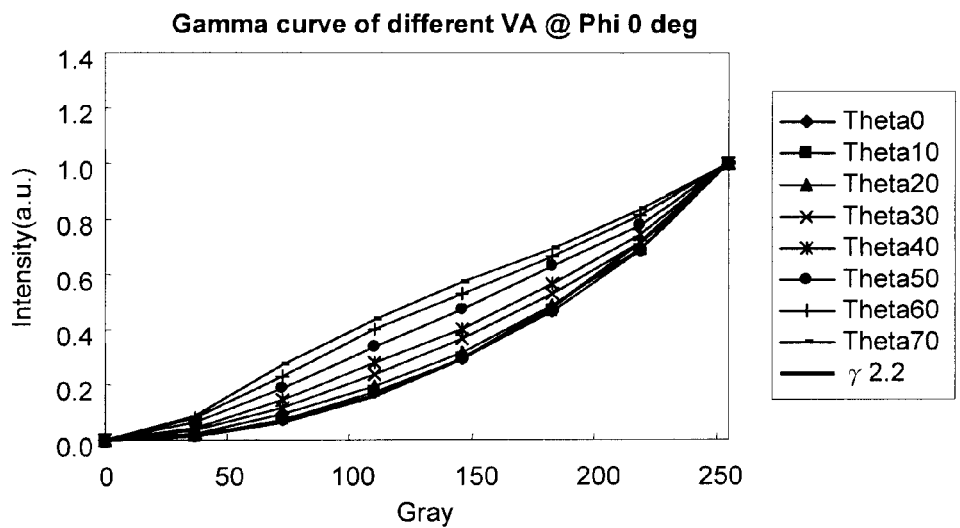
FIG. 8A shows the gamma curves that relate the brightness intensity to the gray scale at eight different viewing angles (theta 0~70) at 0 degree of polar angle Phi of the M-VA mode LCD of the embodiment (without compensation film and with SDF).
Figure 8B:
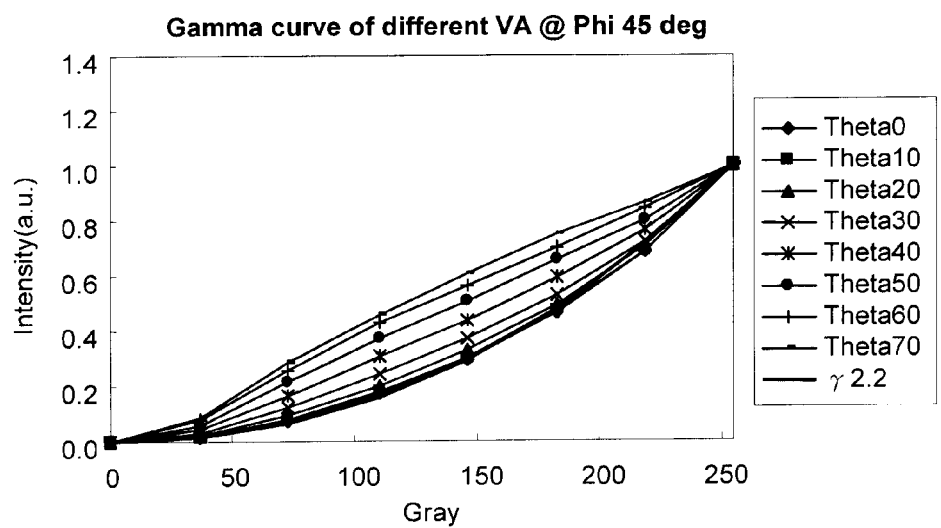
FIG. 8B shows the gamma curves that relate the brightness intensity to the gray scale at eight different viewing angles (theta 0~70) at 45 degree of polar angle Phi of the M-VA mode LCD of the embodiment (without compensation film and with SDF).
Figure 8C:
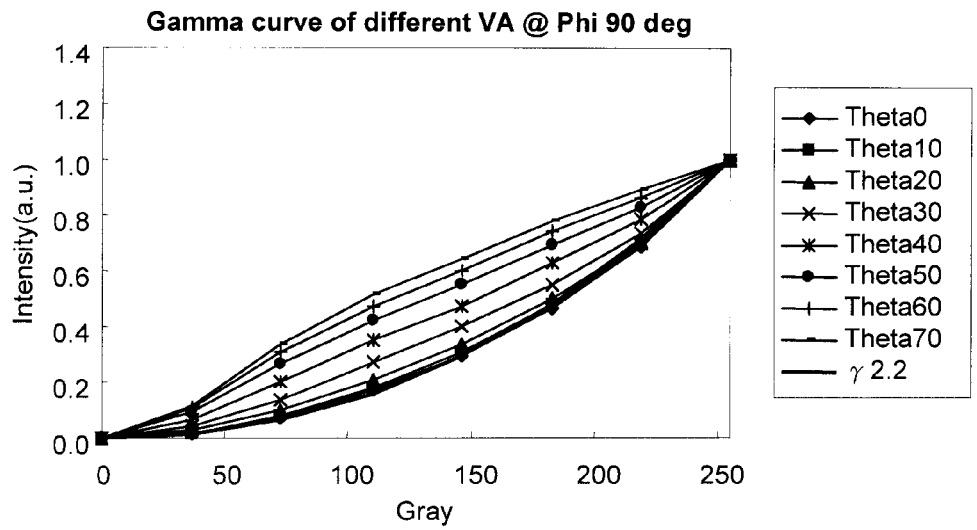
FIG. 8C shows the gamma curves that relate the brightness intensity to the gray scale at eight different viewing angles (theta 0~70) at 90 degree of polar angle Phi of the M-VA mode LCD of the embodiment (without compensation film and with SDF).
Figure 8D:
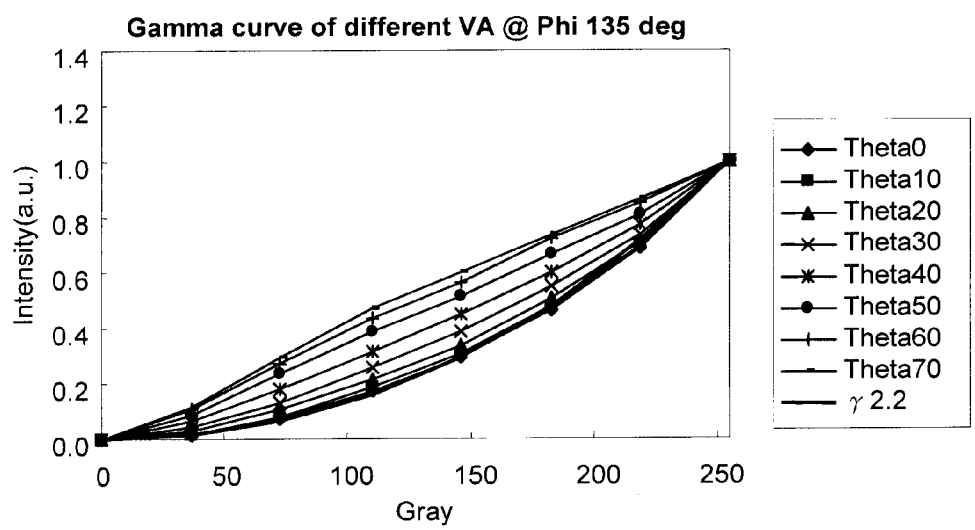
FIG. 8D shows the gamma curves that relate the brightness intensity to the gray scale at eight different viewing angles (theta 0~70) at 135 degree of polar angle Phi of the M-VA mode LCD of the embodiment (without compensation film and with SDF).
Figure 8E:
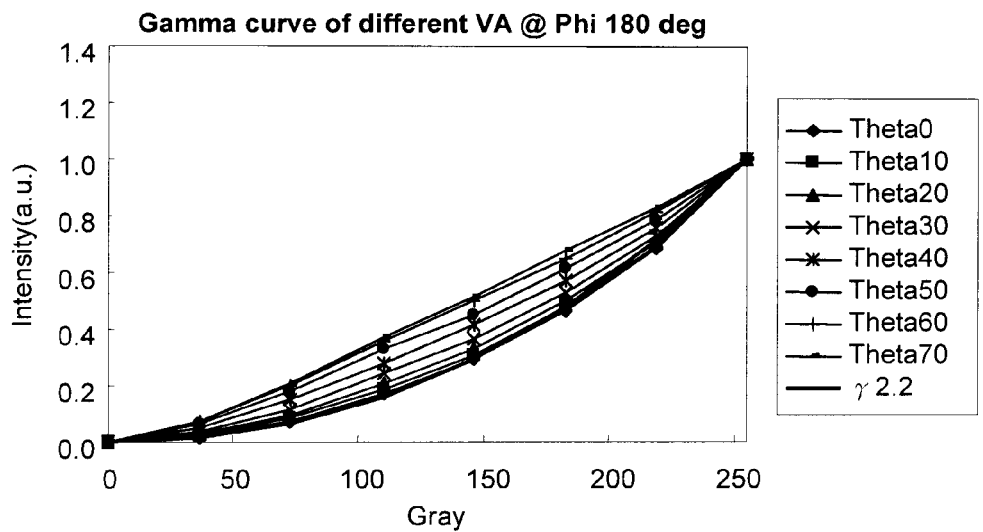
FIG. 8E shows the gamma curves that relate the brightness intensity to the gray scale at eight different viewing angles (theta 0~70) at 180 degree of polar angle Phi of the M-VA mode LCD of the embodiment (without compensation film and with SDF).

FIG. 8A shows the gamma curves that relate the brightness intensity to the gray scale at eight different viewing angles (i.e. Theta 0, Theta 10, Theta 20, Theta 30, Theta 40, Theta 50, Theta 60 and Theta 70) at 0 degree of Phi ($\phi$), wherein a standard $\gamma=2.2$ power-law curve is also presented for comparison. FIG. 8B shows the gamma curves that relate the brightness intensity to the gray scale at eight different viewing angles at 45 degree of Phi ($\phi$), FIG. 8C shows the gamma curves that relate the brightness intensity to the gray scale at eight different viewing angles at 90 degree of Phi ($\phi$), FIG. 8D shows the gamma curves that relate the brightness intensity to the gray scale at eight different viewing angles at 135 degree of Phi ($\phi$), and FIG. 8E shows the gamma curves that relate the brightness intensity to the gray scale at eight different viewing angles at 180 degree of Phi ($\phi$). Compared to FIG. 6A~FIG. 6E and FIG. 7A~FIG. 7E, the gamma curves in each of FIG. 8A~FIG. 8E, which represents the performance of the M-VA mode LCD of the embodiment (with SDF and without compensation film), have shown less intensity differences from the standard $\gamma=2.2$ power-law curve.

Figure 8F:
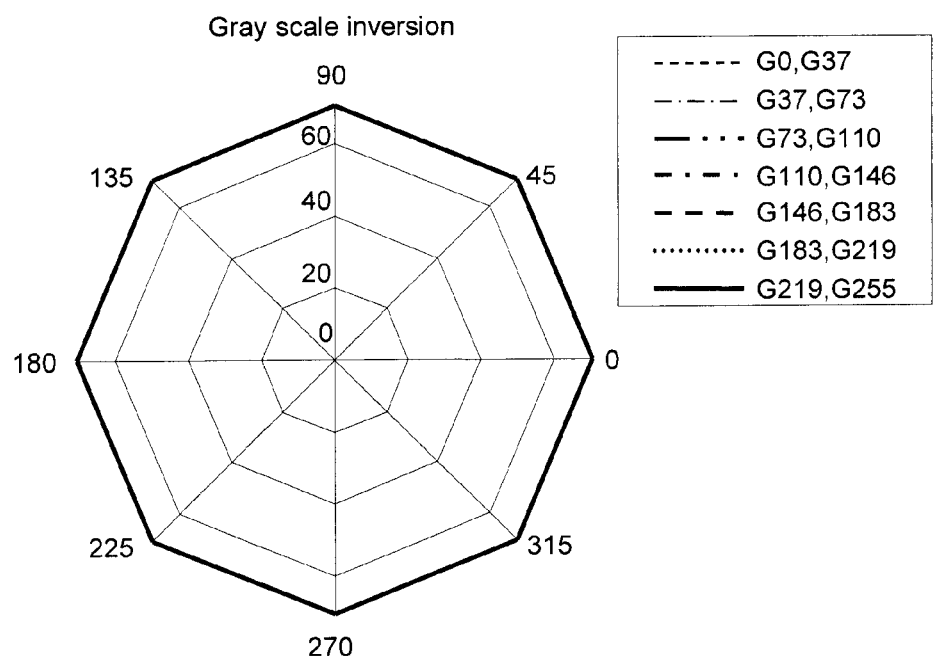
FIG. 8F shows the iso-contrast curves at different gray scale levels from gray 0 (black) to gray 255 (white) of the M-VA mode LCD of the embodiment (without compensation film and with SDF).

FIG. 8F shows the iso-contrast curves at different gray scale levels from gray 0 (black) to gray 255 (white). The result shows that there is no gray scale inversion (GSI) occurs for the M-VA mode LCD of the embodiment (with SDF and without compensation film).

Figure 8G:
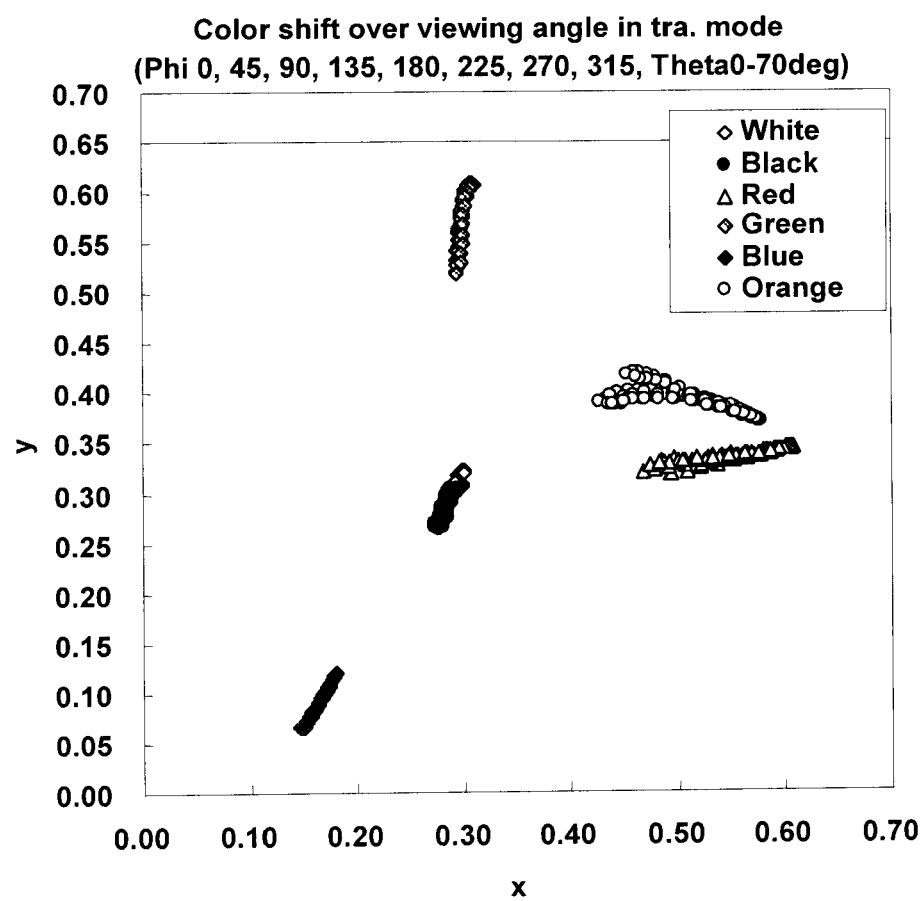
FIG. 8G shows a CIE xy chromaticity diagram plotted by colors obtaining at different viewing angle theta 0~70 degree and at 0, 45, 90, 135, 180, 225, 270 and 315 degree of Phi of the M-VA mode LCD of the embodiment (without compensation film and with SDF).

Furthermore, FIG. 8G shows a CIE xy chromaticity diagram plotted by colors obtained at different viewing angle Theta 0~70 degree and at 0, 45, 90, 135, 180, 225, 270 and 315 degree of Phi. In the CIE xy chromaticity diagram, each point represents a pure hue of a single wavelength. Unlike results of FIG. 6G and FIG. 7G, FIG. 8G clearly shows that hue shift over viewing angle is small; in particular, white color shift is small. Thus, the quality of the image displayed by the M-VA mode LCD of the embodiment (with SDF and without compensation film) is greatly improved.

Figure 9:
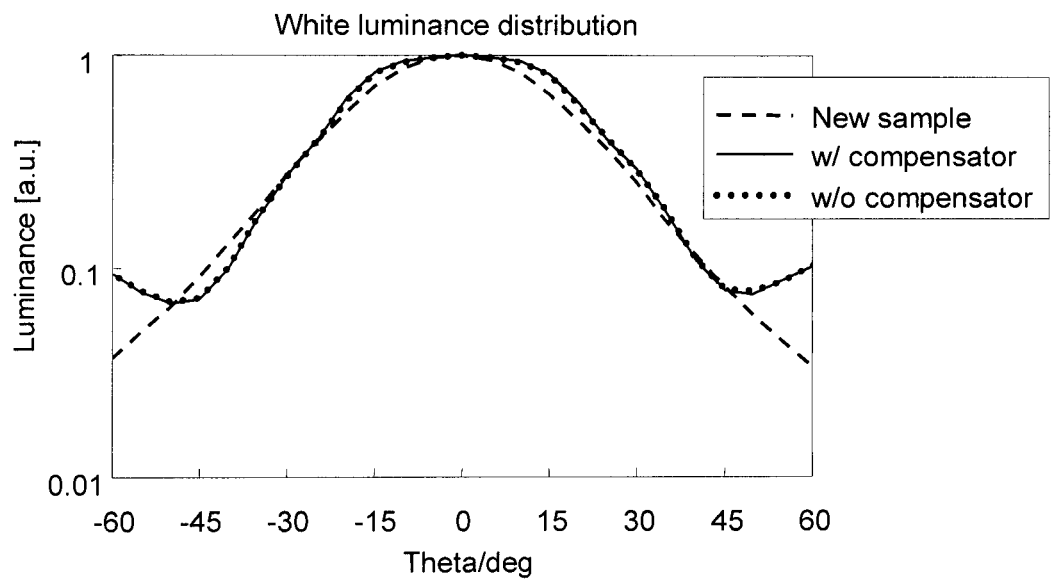
FIG. 9 shows the white luminance distributions of the conventional back light system and the collimated back light system of the embodiment.

FIG. 9 shows the white luminance distributions of the conventional back light system and the collimated back light system of the embodiment. The results of FIG. 9 show that the brightness of the back light system of the embodiment at different viewing angles is substantially the same as the conventional back light system.

Also, four different LCDs, including the LCD structures of the embodiment (with SDF and without compensation film), the M-VA mode LCD with compensation film (i.e. the current VA display, no SDF), an M-VA mode LCD without compensation film (no SDF), and FFS mode LCD are further investigated to compare the gray scale inversions (GSI), contrast ratios (CR) and color changes. Those results are presented in FIG. 10-FIG. 13B.

Figure 10:
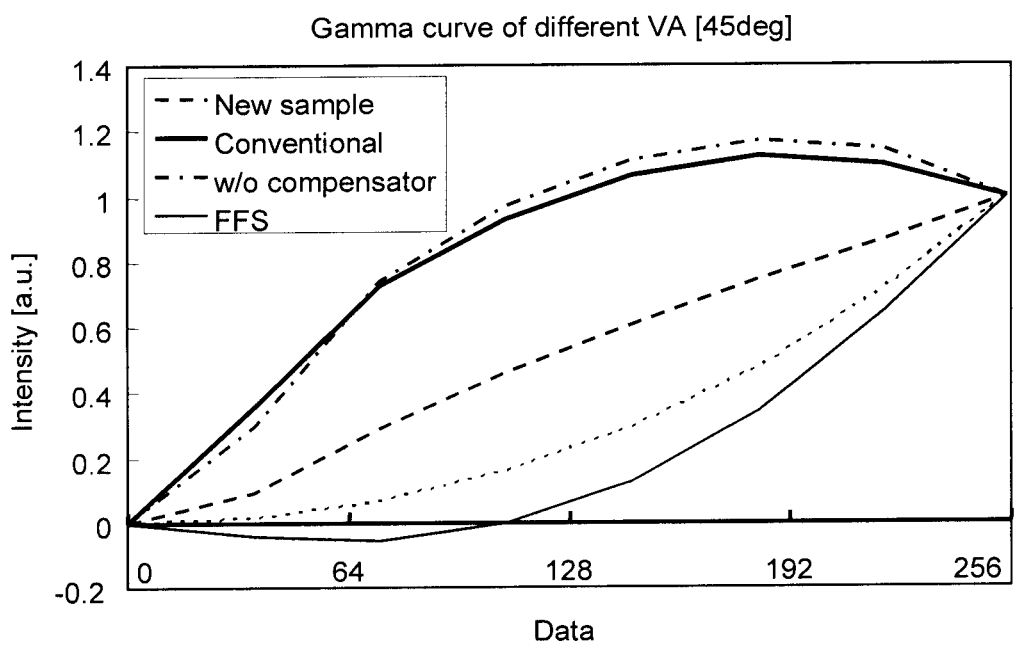
FIG. 10 shows the gamma curves that relate the brightness intensity to the gray scale at 45 degree of polar angle Phi (φ) of four different LCDs, including the LCD structures of the embodiment (with SDF and without compensation film), the M-VA mode LCD with compensation film (i.e. the current VA display, no SDF), an M-VA mode LCD without compensation film (no SDF), and FFS mode LCD.

FIG. 10 shows the gamma curves that relate the brightness intensity to the gray scale at 45 degree of polar angle Phi ($\phi$) of four different LCDs, including the LCD structures of the embodiment (with SDF and without compensation film), the M-VA mode LCD with compensation film (i.e. the current VA display, no SDF), an M-VA mode LCD without compensation film (no SDF), and FFS mode LCD. According to the results, the LCD structure of the embodiment (with SDF and without compensation film) with small gray scale inversion (GSI) is observed.

Figure 11A:
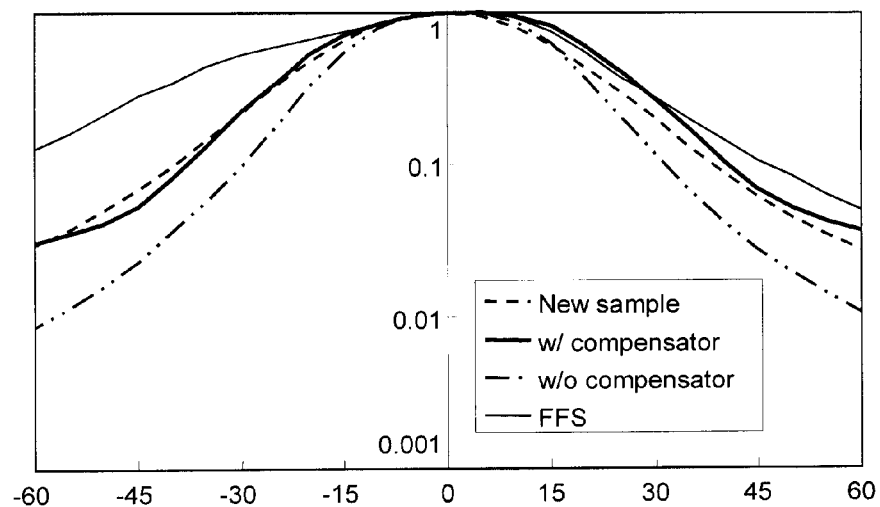
FIG. 11A shows the contrast ratios of four LCDs in the left-right (0-180° azimuth angle/polar angle) direction as a function of viewing angle theta.
Figure 11B:
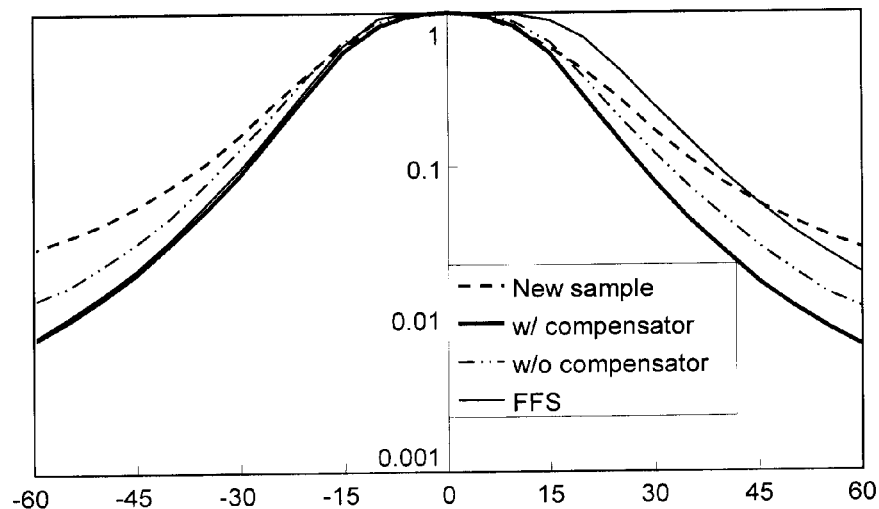
FIG. 11B shows the contrast ratios of four LCDs in the 45°-225° azimuth angle as a function of viewing angle theta.

FIG. 11A shows the contrast ratios of four LCDs in the left-right (0-180° azimuth angle/polar angle) direction as a function of viewing angle theta. FIG. 11B shows the contrast ratios of four LCDs in the 45°-225° azimuth angle as a function of viewing angle theta. The results show that the curves of FIG. 11A and FIG. 11B representing the LCD structure of the embodiment (with SDF and without compensation film) are substantially symmetric, particular the curve in FIG. 11B.

Figure 12A:
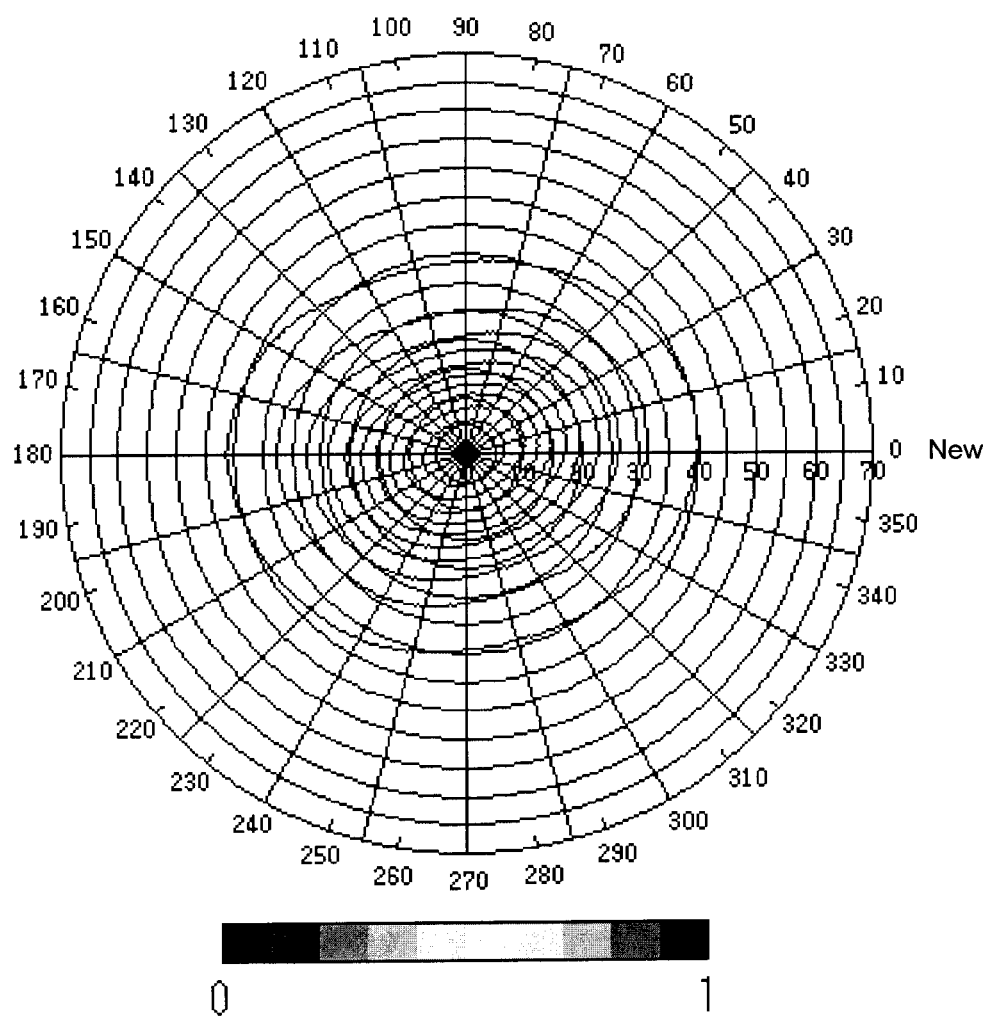
FIG. 12A shows the iso-contrast contours of the LCD structure of the embodiment (with SDF and without compensation film).
Figure 12B:
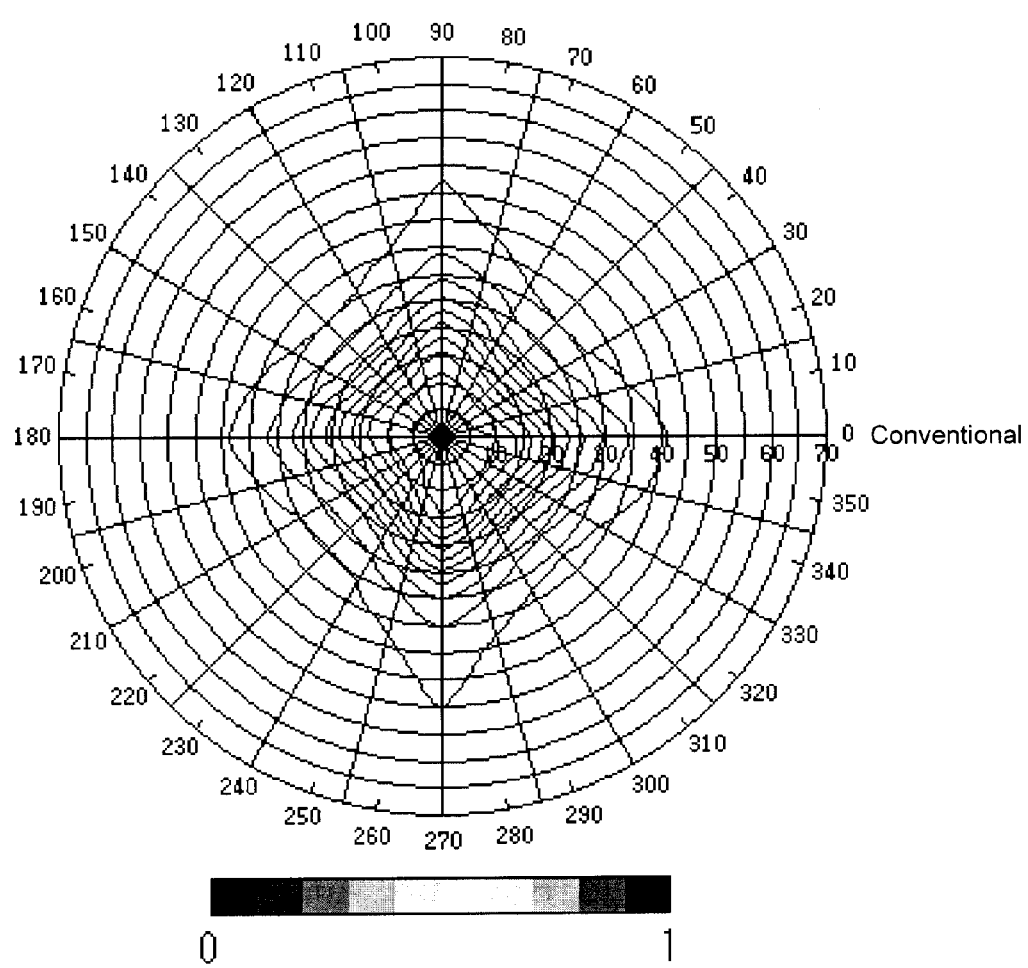
FIG. 12B shows the iso-contrast contours of the conventional LCD structure.

FIG. 12A shows the iso-contrast contours of the LCD structure of the embodiment (with SDF and without compensation film). FIG. 12B shows the iso-contrast contours of the conventional LCD structure. Compared FIG. 12A and FIG. 12B, it is found that the iso-contrast contours of LCD structure of the embodiment are greatly improved, particularly at 45°-225° azimuth angle.

Figure 13A:
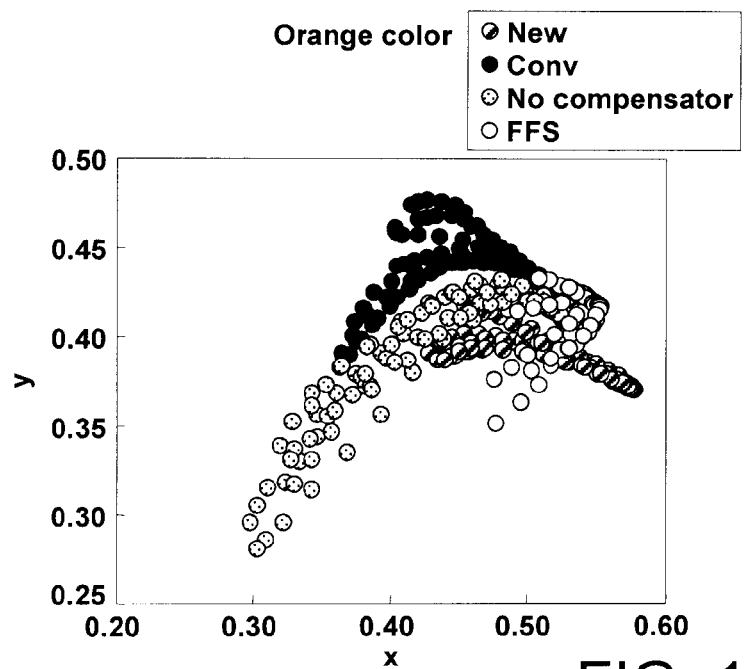
FIG. 13A is a CIE xy chromaticity diagram showing orange color of four different LCDs.
Figure 13B:
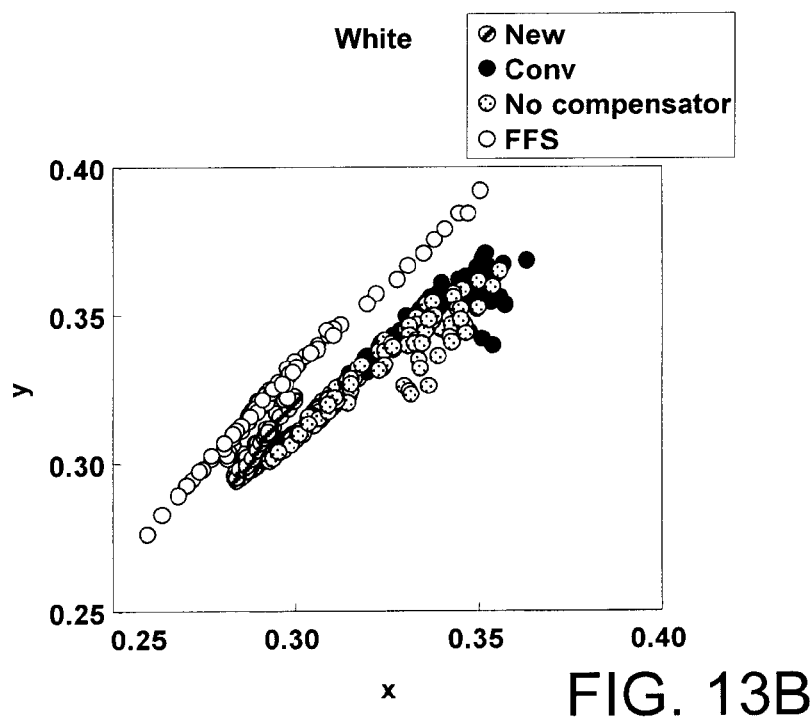
FIG. 13B is a CIE xy chromaticity diagram showing white color of four different LCDs.

FIG. 13A is a CIE xy chromaticity diagram showing orange color of four different LCDs. FIG. 13B is a CIE xy chromaticity diagram showing white color of four different LCDs. The results of FIG. 13A and FIG. 13B have proved that the color change and hue shift of the LCD structure of the embodiment are small.

Table 1 summarizes the results of four LCDs, including the LCD structure of the embodiment (with SDF and without compensation film), the M-VA mode LCD with compensation film (i.e. the current VA display, no SDF), an M-VA mode LCD without compensation film (no SDF) and FFS mode LCD, for comparison.

| | VA mode LCD w/ compensation film (current VA display, no SDF) | VA mode LCD w/o compensation film | LCD structure of the embodiment (with SDF and without compensation film) | FFS mode LCD |
|---|---|---|---|---|
| CR | 100 | 100 | 90 | 90 |
| CR change | good | bad | Good in all azimuth angle | Very good |
| γ change | Huge | Huge | Small | Very small |
| GSI | at 50 (white) | at 60 (white) | No | Very small |
| Brightness distribution | — | — | Same | — |
| Color change Δ(x, y) (0~70 deg., orange) | 0.170 (Hue shift) | 0.276 (Hue shift) | 0.150 (Small hue shift) | 0.111 (Small hue shift) |

Second Embodiment

Reflective Type of LCD

Figure 14A:
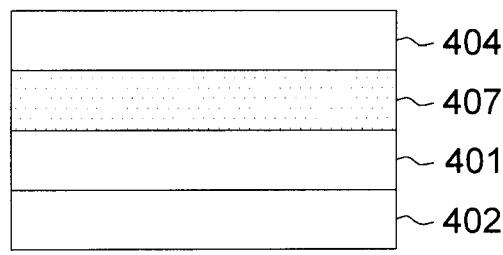
FIG. 14A and FIG. 14B simply illustrates two reflective types of LCD according to the second embodiment of the present disclosure.
Figure 14B:
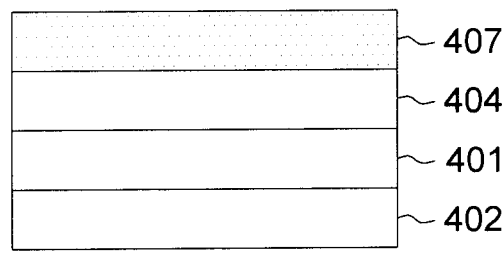

A reflective type of LCD is developed by replacing a backlight in transmissive LCD with a diffusive reflector. Reflective LCDs are the least costly, but require bright light. Viewing is difficult in dark rooms or outside at night. The structure of the present disclosure can be incorporated into the reflective display for decreasing the process cost and improving the performance of LCD. FIG. 14A and FIG. 14B simply illustrates two reflective types of LCD according to the second embodiment of the present disclosure.

As shown in FIG. 14A and FIG. 14B, the reflective type of LCD 40 or 40' at least comprises a liquid crystal (LC) panel containing a LC layer 401, a mirror reflector 402, an upper polarizer 404, and a symmetric diffusion film (SDF) 407. The mirror reflector 402 is disposed below the LC layer 401 for reflecting the ambient light in the vicinity (passing through the LC layer 401 to the mirror reflector 402) to the viewer. The SDF 407 is disposed at one side of the upper polarizer 404. A lower polarizer (not shown) could be disposed on the mirror reflector 402. The structural difference between reflective LCD 40 and LCD 40' is the position of the SDF 407. In FIG. 14A, the SDF 407 is disposed at the rear surface of the upper polarizer 104, and sandwiched between the upper polarizer 404 and the LC layer 401. In FIG. 14B, the SDF 407 is disposed at the top (i.e. front surface) of the upper polarizer 404. According to the second embodiment, no compensation film such as wide-view films is required for the upper polarizer 404, and the mirror reflector 402 has a flat surface.

In the second embodiment, a half-width at half-maximum (HWHM) of the light scattered by the SDF 407 is in a range of 5 degree to 20 degree. Please refer to the first embodiment for the details of the structure, composition and material of the SDF 407. Similar to the first embodiment, the reflective types of LCD of the second embodiment using the SDF and polarizer without compensation film possesses advantages of low cost of production and high image quality such as contrast ratio improvement and small color shift at wide viewing angles.

Moreover, the reflective type of LCD applied by the embodiment could optionally incorporate other structural design.

Figure 15:
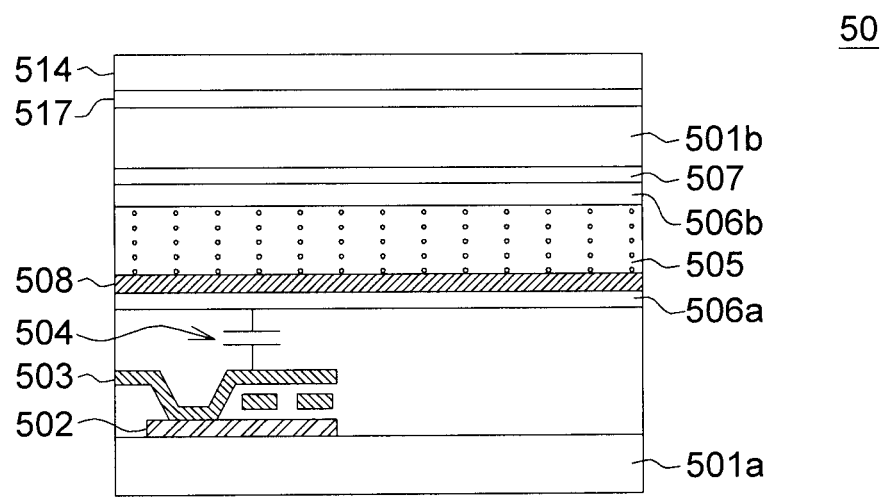
FIG. 15 schematically illustrates one application of reflective types of LCD according to the second embodiment of the present disclosure.

FIG. 15 schematically illustrates one application of reflective types of LCD according to the second embodiment of the present disclosure. As shown in FIG. 15, the reflective LCD 50 includes a first glass substrate 501a and a second glass substrate 501b, a polysilicon layer 502 on the first glass substrate 501a, a metal bus line 503, a LC layer 505 between the first ITO 506a and the second ITO 506b, a color filter 507 between the second glass substrate 501b and the second ITO 506b, a mirror reflector 508 formed on the first ITO 506a for reflecting the ambient light to illuminate the display, an upper polarizer 514 above the second glass substrate 501b, and a SDF 517 between the upper polarizer 514 and LC layer 505 (ex: disposed at the rear side of the upper polarizer 514). Parasitic capacitance 504 occurs between the first ITO 506a and the metal bus line 503.

Figure 16:
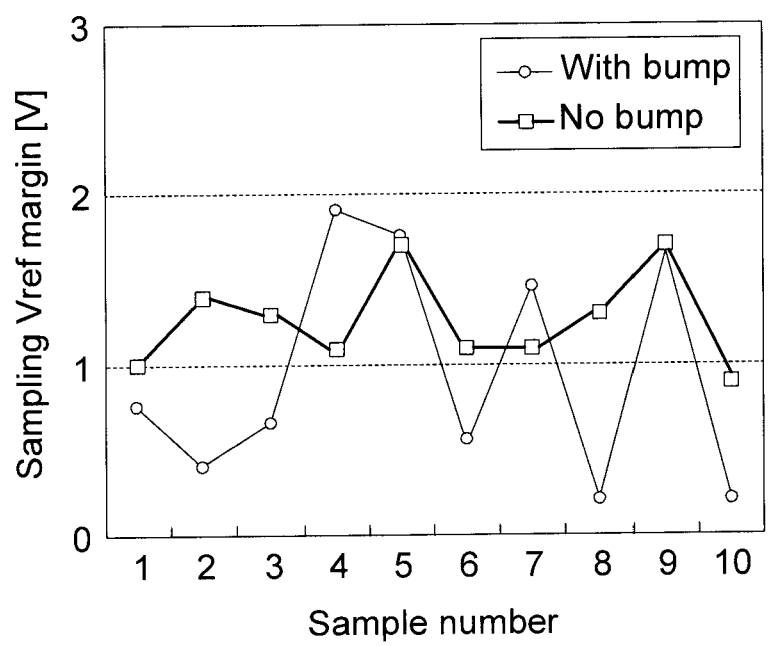
FIG. 16 shows a measured reference voltage (Vref) margin for pixel voltage sampling on the reflective LCD with and without bumpy reflector structure.

In the conventional reflective LCD design, an ITO and reflector formed there on (ex: positions of first ITO 506a and mirror reflector 508 as shown in FIG. 15) would be configured with bumpy surface, thereby inducing unstable parasitic capacitance. For reflective LCD, particular LCD with memory in pixel (MIP) circuit, unstable parasitic capacitance has considerable impact on the driving stability. Also, design of storage capacitance has to be changed by the bumpy surface design, and process cost is high due to the manufacture of the bumpy surface (ex: mask and process). In the second embodiment, the mirror reflector 508 has a flat surface and no bumpy surface is required; thereby generating uniform parasitic capacitance in the LCD and solving the problems of the conventional design. FIG. 16 shows a measured reference voltage (Vref) margin for pixel voltage sampling on the reflective LCD with and without bumpy reflector structure. The square symbol -□- represents a curve of sampling Vref margin for LCD without bumpy reflector. The circular symbol -•- represents a curve of sampling Vref margin for LCD with bumpy reflector. FIG. 16 clearly shows that the LCD without bumpy reflector has more stable Vref margin.

Moreover, a white polarizer could be used as the upper polarizer 404/514 in the reflective LCD of the second embodiment for improving the image quality, such as solving the yellowish image problem in the reflective type of LCD.

Third Embodiment

Transflective Type of LCD

Figure 17A:
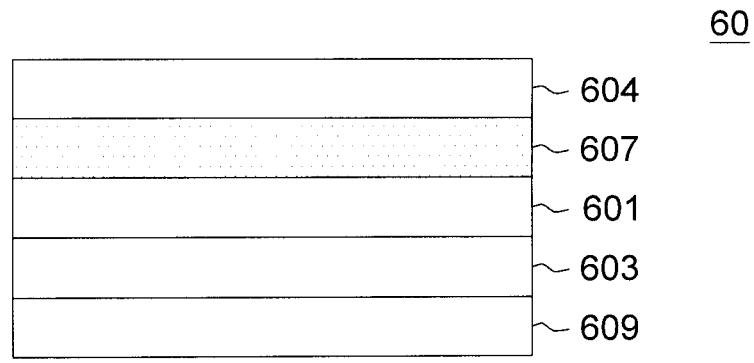
FIG. 17A and FIG. 17B simply illustrates two transflective types of LCD according to the third embodiment of the present disclosure.
Figure 17B:
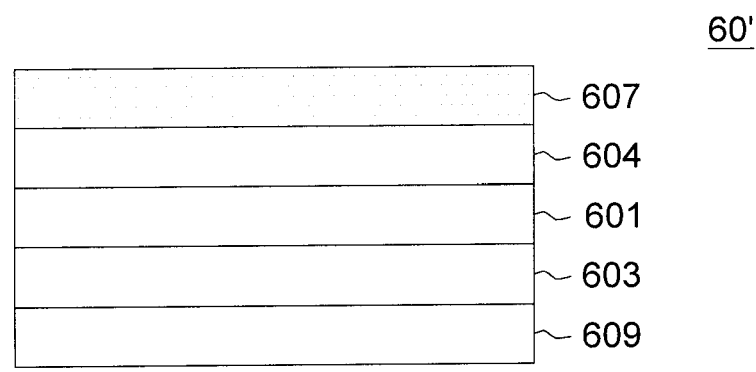

Transflective LCDs are a mixture of the reflective and transmissive types. They uses a backlight as does transmissive, but also adds a reflective mirror to reflect the ambient light. Transflective LCDs are combined with a backlight for use in all types of lighting conditions. The backlight can be left off where there is sufficient outside lighting, conserving power. In darker environments, the backlight is turned on to provide a bright display. The structure of the present disclosure can be also incorporated into the transflective type of LCD for decreasing the process cost and improving the performance of LCD. FIG. 17A and FIG. 17B simply illustrates two transflective types of LCD according to the third embodiment of the present disclosure.

As shown in FIG. 17A and FIG. 17B, the transflective type of LCD 60 or 60' at least comprises a LC panel containing a LC layer 601 with partial flat reflector, a lower polarizer 603, an upper polarizer 604, a symmetric diffusion film (SDF) 607 disposed at one side of the upper polarizer 607, and a backlight system 609 disposed under the LC panel for providing a collimated light towards the LC panel. The structural difference between reflective LCD 60 and LCD 60' is the position of the SDF 607. In FIG. 17A, the SDF 607 is disposed at the rear surface of the upper polarizer 604, and sandwiched between the upper polarizer 604 and the LC layer 601. In FIG. 17B, the SDF 607 is disposed at the top (i.e. front surface) of the upper polarizer 604. According to the third embodiment, no compensation film such as wide-view films is required for the upper polarizer 604 and the lower polarizer 603.

Figure 18:
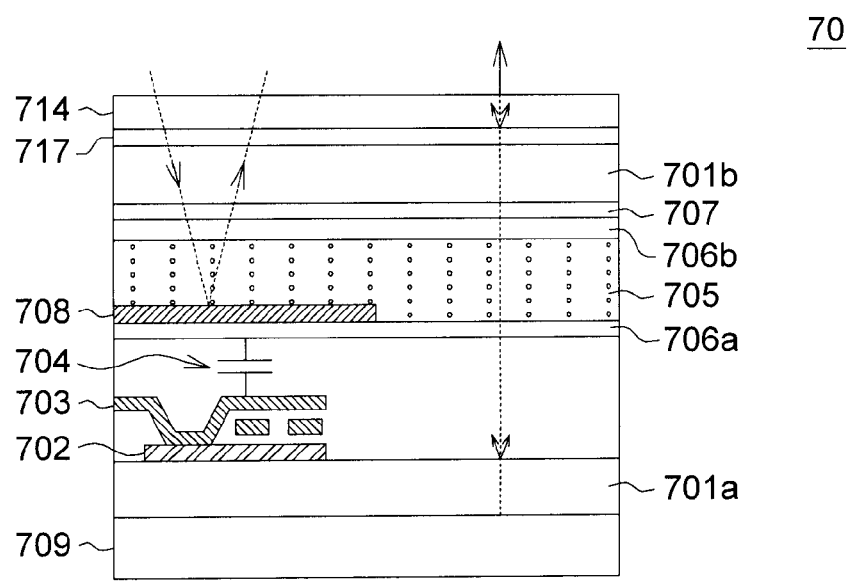
FIG. 18 schematically illustrates one application of transflective types of LCD according to the third embodiment of the present disclosure.

FIG. 18 schematically illustrates one application of transflective types of LCD according to the third embodiment of the present disclosure. As shown in FIG. 18, the transflective LCD 70 includes a first glass substrate 701a and a second glass substrate 701b, a polysilicon layer 702 on the first glass substrate 701a, a metal bus line 703, a LC layer 705 between the first ITO 706a and the second ITO 706b, a color filter 707 between the second glass substrate 701b and the second ITO 706b, a mirror reflector 708 partially formed on the first ITO 706a for reflecting the ambient light to illuminate the display (functioning as a reflective mode), a backlight system 709 disposed under the LC panel to provide a collimated light towards the LC panel (functioning as a Transmissive mode), an upper polarizer 714 above the second glass substrate 701b, and a SDF 717 between the upper polarizer 714 and LC layer 705 (ex: disposed at the rear side of the upper polarizer 714). Parasitic capacitance 704 occurs between the first ITO 706a and the metal bus line 703.

In the third embodiment, the backlight system 609 provides a collimated light towards the LC panel, and a half-width at half-maximum (HWHM) of the collimated light is in a range of 5 degree to 15 degree, approximately. In the third embodiment, a half-width at half-maximum (HWHM) of the light scattered by the SDF 607/717 is in a range of 5 degree to 20 degree. Please refer to the first embodiment for the details of the structure, composition and material of the SDF 607/717.

Similar to the first and second embodiments, the transflective LCD of the third embodiment using the SDF and polarizer without compensation film possesses the advantages of the transmissive and reflective types of LCDs, such as low cost of production and high image quality such as contrast ratio improvement and small color shift at wide viewing angles. Also, the mirror reflector 708 partially formed on the first ITO 706a in the third embodiment has a flat surface (i.e. no bumpy surface is required), thereby generating uniform parasitic capacitance in the LCD and obtaining more stable Vref margin when the reflective mode is operated. Moreover, a white polarizer could be optionally used as the upper polarizer 604/614 in the transflective LCD of the third embodiment for improving the image quality, such as solving the yellowish image problem occurred in the reflective mode of LCD.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A symmetric diffusion film (SDF), applied to a flat panel display, comprising at least two different materials of a first material having a first refractive index mixed with a second material having a second refractive index, and the first refractive index being different from the second refractive index, wherein a half-width at half-maximum (HWHM) of a collimated light passing through the SDF and scattered by the SDF is in a range of 5 degree to 20 degree.

2. The SDF according to claim 1, wherein the difference in the first refractive index and the second refractive index is larger than 0 and no more than 0.1.

3. The SDF according to claim 1, wherein the second material is configured as a plurality of particles sized in a range of 0.1 μm to 10 μm and distributed in the first material.

4. The SDF according to claim 1, wherein the first material is an organic material and the second material is a non-organic material or a transparent conductive material.

5. The SDF according to claim 1, wherein the first material is an adhesive or resin.

6. The SDF according to claim 1, wherein a thickness of the SDF is between 20 μm and 200 μm.

7. A flat panel display, at least comprising:
a liquid crystal (LC) panel including a LC layer;
an upper polarizer, disposed on the LC panel and adapting no compensation film; and
a symmetric diffusion film (SDF), disposed at one side of the upper polarizer, and the SDF comprising at least two different materials, including a first material having a first refractive index mixed with a second material having a second refractive index, and the first refractive index being different from the second refractive index;
wherein a collimated light passes the LC panel and scattered by the SDF, and
wherein a half-width at half-maximum (HWHM) of the collimated light scattered by the SDF is in a range of 5 degree to 20 degree.

8. The flat panel display according to claim 7, further comprising a backlight system disposed under the LC panel for providing the collimated light towards the LC panel, wherein a half-width at half-maximum (HWHM) of the collimated light is in a range of 5 degree to 15 degree.

9. The flat panel display according to claim 7, further comprising a lower polarizer, and the LC panel is disposed between the lower polarizer and the upper polarizer, wherein both of the lower and upper polarizers adapt no compensation film.

10. The flat panel display according to claim 7, wherein the LC panel further comprises a reflective layer under the LC layer.

11. The flat panel display according to claim 10, wherein the reflective layer is a mirror reflector with a flat surface.

12. The flat panel display according to claim 7, wherein the SDF is disposed at the top of the upper polarizer.

13. The flat panel display according to claim 7, wherein the SDF is disposed between the upper polarizer and the LC panel.

14. The flat panel display according to claim 7, wherein the difference in the first refractive index and the second refractive index is larger than 0 and no more than 0.1.

15. The flat panel display according to claim 7, wherein the second material is configured as a plurality of particles sized in a range of 0.1 μm to 10 μm and distributed in the first material.

16. The flat panel display according to claim 7, wherein the first material is an organic material and the second material is a non-organic material or a transparent conductive material.

17. The flat panel display according to claim 7, wherein the first material is an adhesive or resin.

18. The flat panel display according to claim 7, wherein a thickness of the SDF is between 20 μm and 200 μm.

* * * * *